US011438796B2

(12) United States Patent
Lee et al.

(10) Patent No.: US 11,438,796 B2
(45) Date of Patent: Sep. 6, 2022

(54) ELECTRONIC DEVICE SUPPORTING DUAL CONNECTIVITY AND METHOD OF CONTROLLING POWER OF ELECTRONIC DEVICE

(71) Applicant: Samsung Electronics Co., Ltd., Suwon-si (KR)

(72) Inventors: Jookwan Lee, Suwon-si (KR); Sangho Lee, Suwon-si (KR); Taeseop Lee, Suwon-si (KR); Wonsuk Chung, Suwon-si (KR); Hong Kim, Suwon-si (KR); Suyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 15/929,742

(22) Filed: May 19, 2020

(65) Prior Publication Data

US 2020/0374750 A1 Nov. 26, 2020

(30) Foreign Application Priority Data

May 20, 2019 (KR) .................. 10-2019-0059022
Jun. 5, 2019 (KR) .................. 10-2019-0066914

(51) Int. Cl.
*H04W 88/06* (2009.01)
*H04W 28/06* (2009.01)
(Continued)

(52) U.S. Cl.
CPC .......... *H04W 28/06* (2013.01); *H04L 1/1867* (2013.01); *H04W 28/0278* (2013.01);
(Continued)

(58) Field of Classification Search
CPC ............ H04W 28/06; H04W 28/0278; H04W 52/0216; H04W 80/02; H04W 88/06;
(Continued)

(56) References Cited

U.S. PATENT DOCUMENTS

2016/0323805 A1 11/2016 Ryu et al.
2017/0230873 A1* 8/2017 Baek .............. H04W 36/0011
(Continued)

FOREIGN PATENT DOCUMENTS

KR 10-2019-0020151 A 2/2019
KR 10-2019-0053066 A 5/2019
(Continued)

OTHER PUBLICATIONS

Ameen, "5G NR-RAN Deep Dive 2018 Q4 release", academia.edu, Sep. 10, 2018, 300 pages.
(Continued)

*Primary Examiner* — Mandish K Randhawa

(57) ABSTRACT

An electronic device comprises a first transceiver configured to transmit/receive data via a first communication network, a second transceiver configured to transmit/receive data via a second communication network, and at least one communication processor electrically connected with at least one of the first transceiver and the second transceiver, wherein the at least one communication processor is configured to identify transmission of transmission data via the first communication network, upon transmission of the transmission data via the first communication network, identify whether there is transmission data to be transmitted via the second communication network from a PDCP buffer, and when it is identified that there is no transmission data to be transmitted via the second communication network, perform control to transmit the transmission data to be transmitted via the first communication network, via the first transceiver, based on second maximum transmission power larger than preset first maximum transmission power.

20 Claims, 16 Drawing Sheets

(51) Int. Cl.
*H04W 28/02* (2009.01)
*H04L 1/18* (2006.01)
*H04W 80/02* (2009.01)
*H04W 52/02* (2009.01)

(52) U.S. Cl.
CPC ....... *H04W 52/0216* (2013.01); *H04W 80/02* (2013.01); *H04W 88/06* (2013.01)

(58) Field of Classification Search
CPC .............. H04W 28/0221; H04W 76/16; H04L 1/1867; H04L 45/22; H04L 45/24; H04L 47/34; Y02D 30/70
See application file for complete search history.

(56) References Cited

U.S. PATENT DOCUMENTS

| | | |
|---|---|---|
| 2017/0339706 A1 | 11/2017 | Andreoli-Fang et al. |
| 2018/0167897 A1 | 6/2018 | Sampath et al. |
| 2019/0045568 A1 | 2/2019 | Palat et al. |
| 2019/0141571 A1 | 5/2019 | Kim et al. |
| 2019/0281645 A1 | 9/2019 | Van Der Velde et al. |
| 2020/0068504 A1 | 2/2020 | Yi et al. |
| 2021/0168736 A1* | 6/2021 | Cho .................... H04W 52/225 |

FOREIGN PATENT DOCUMENTS

| | | |
|---|---|---|
| WO | 2015108337 A1 | 7/2015 |
| WO | 2018199691 A1 | 11/2018 |

OTHER PUBLICATIONS

Intel Corporation, "Uplink power control for NR-NR Dual Connectivity", 3GPP TSG-RAN WG1 #97, May 13-17, 2019, R1-1906826, 8 pages.
International Search Report dated Aug. 27, 2020 in connection with International Patent Application No. PCT/KR2020/006405, 3 pages.
Written Opinion of the International Searching Authority dated Aug. 27, 2020 in connection with International Patent Application No. PCT/KR2020/006405, 5 pages.

* cited by examiner

ELECTRONIC DEVICE SUPPORTING DUAL CONNECTIVITY AND METHOD OF CONTROLLING POWER OF ELECTRONIC DEVICE

CROSS-REFERENCE TO RELATED APPLICATIONS

This application is based on and claims priority under 35 U.S.C. 119 to Korean Patent Application No. 10-2019-0059022, filed on 2019 May 20, in the Korean Intellectual Property Office, and Korean Patent Application No. 10-2019-0066914, filed on 2019 Jun. 5, in the Korean Intellectual Property Office, the disclosure of both of which is herein incorporated by reference in its entirety.

BACKGROUND

1. Field

Various embodiments of the disclosure relate to an electronic device supporting dual connectivity and a method of controlling the power of the electronic device.

2. Description of Related Art

As mobile communication technology evolves, multi-functional portable terminals are commonplace and, to meet increasing demand for radio traffic, vigorous efforts are underway to develop 5G communication systems. To achieve a higher data transmission rate, 5G communication systems are being implemented on ultra-high frequency bands as well as those used for 3G communication systems and long-term evolution (LTE) communication systems.

To implement 5G communication, stand-alone (SA) and non-standalone (NSA) schemes are taken into consideration. The NSA scheme uses new radio (NR) systems together with legacy LTE systems. In the NSA scheme, user equipment (UE) may use not only eNBs of the LTE system but also gNBs of the NR system. Technology allowing UEs to use heterogeneous communication systems may be termed dual connectivity.

Dual connectivity has been first proposed in 3GPP release-12 where the 3.5 GHz frequency band other than that for LTE system is used for small cells. The 5G NSA scheme may be implemented to use the LTE system as a master node and the NR system as a secondary node in the dual connectivity proposed in 3GPP release-12.

Dual connectivity-supporting electronic devices may perform communication over heterogeneous communication networks as set forth above. Such an electronic device may include separate communication processors for processing signals from the communication networks. If data exchange between the two separate communication processors cannot be performed quickly, the maximum transmission power allowed for each UE may not be effectively used.

For example, dual connectivity-supporting electronic devices may limit the respective transmission power levels of the LTE communication network signal and NR communication network signal to specific values (e.g., 20 dBm) considering the maximum transmission power (e.g., 23 dBm) when the LTE communication network signal and the NR communication network signal are simultaneously transmitted. In such a case, although a specific communication network signal alone is transmitted, it may be impossible to secure sufficient transmission power and, thus, the base station may fail to normally receive data.

The above information is presented as background information only to assist with an understanding of the disclosure. No determination has been made, and no assertion is made, as to whether any of the above might be applicable as prior art with regard to the disclosure.

SUMMARY

According to various embodiments, there may be provided a dual connectivity-supporting electronic device that may maximally use the NR transmission power by determining whether there is LTE transmission data via a packet data convergence protocol (PDCP) buffer even when dynamic power sharing (DPS) is difficult to apply and a method of controlling the power of the electronic device.

In accordance with various embodiments, an electronic device comprises a first transceiver configured to transmit/receive data via a first communication network, a second transceiver configured to transmit/receive data via a second communication network, and at least one communication processor electrically connected with at least one of the first transceiver and the second transceiver, wherein the at least one communication processor is configured to identify transmission of transmission data via the first communication network, upon transmission of the transmission data via the first communication network, identify whether there is transmission data to be transmitted via the second communication network from a packet data convergence protocol (PDCP) buffer, and when it is identified that there is no transmission data to be transmitted via the second communication network, perform control to transmit the transmission data to be transmitted via the first communication network, via the first transceiver, based on second maximum transmission power larger than preset first maximum transmission power.

In accordance with various embodiments, a method of controlling transmission power by an electronic device comprises identifying transmission of transmission data via a first communication network, upon transmission of the transmission data via the first communication network, identifying whether there is transmission data to be transmitted via a second communication network from a PDCP buffer, and when it is identified that there is no transmission data to be transmitted via the second communication network, transmit the transmission data to be transmitted via the first communication network, based on second maximum transmission power larger than preset first maximum transmission power.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
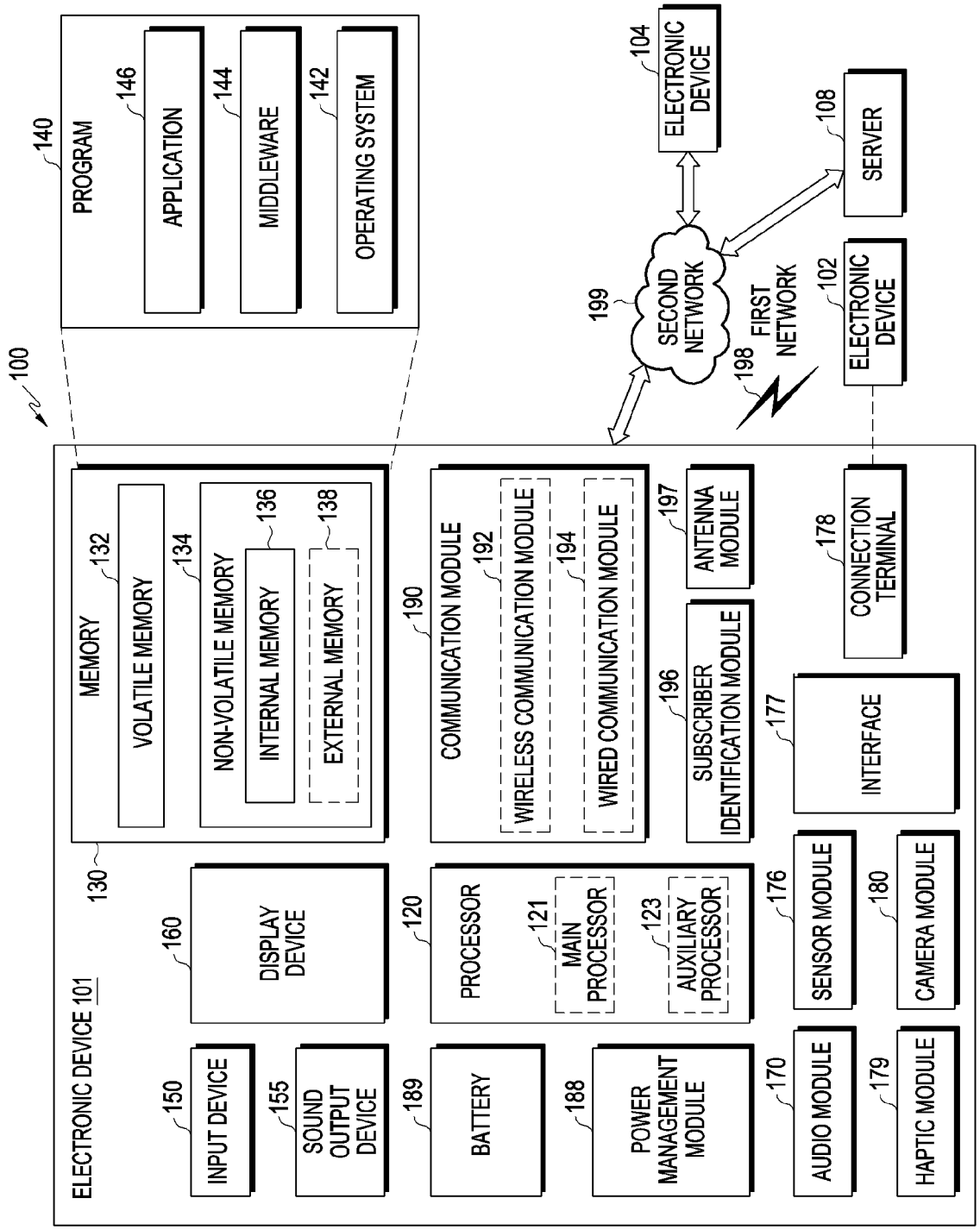
FIG. 1 illustrates a view of an electronic device in a network environment according to an embodiment.

FIG. 1 illustrates a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199

(e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
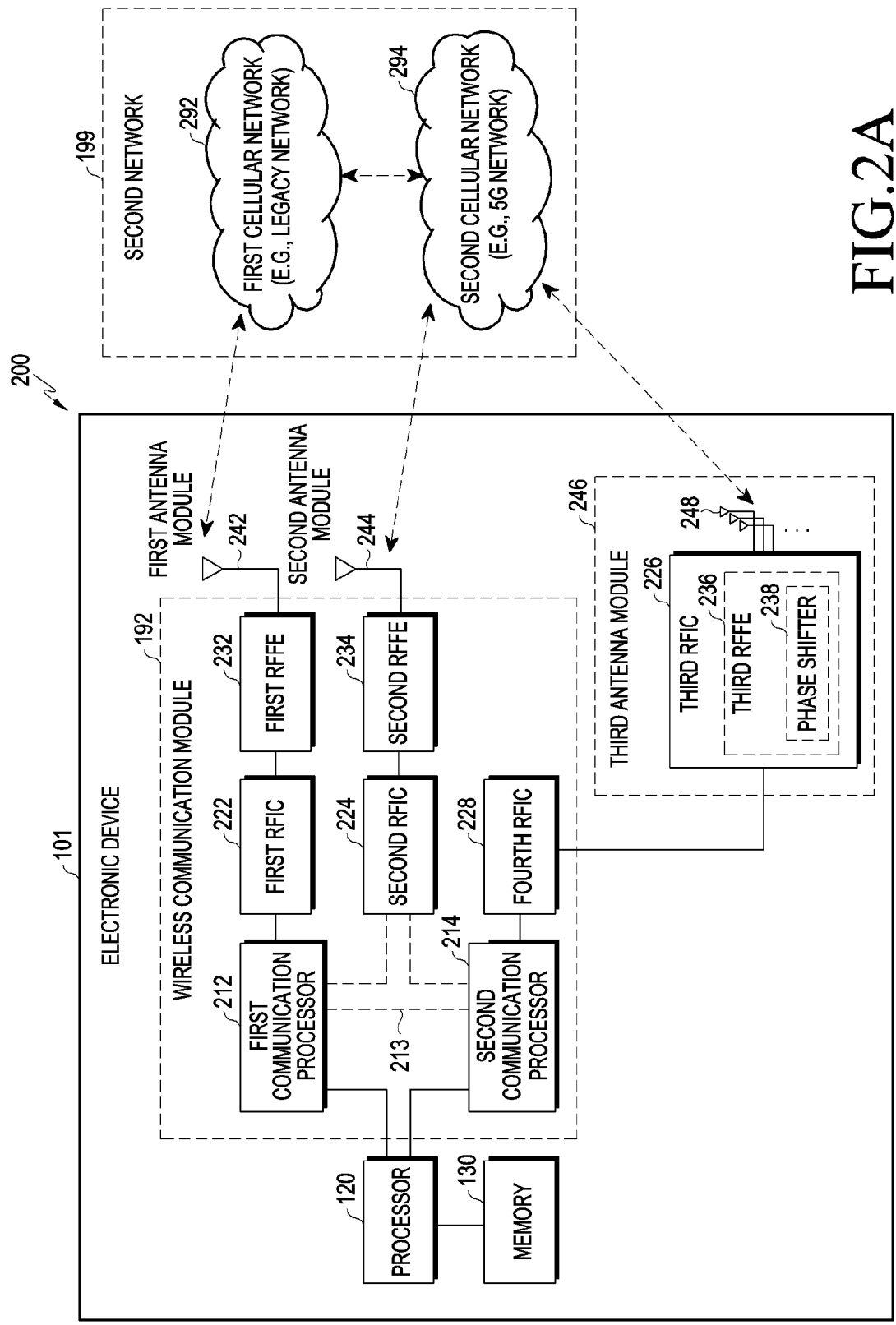
FIG. 2A illustrates a block diagram of an electronic device for supporting legacy network communication and 5G network communication according to an embodiment.

FIG. 2A illustrates a block diagram 200 of an electronic device 101 for supporting legacy network communication and 5G network communication according to an embodiment. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The network 199 may include a first network 292 and a second network 294. According to an embodiment, the electronic device 101 may further include at least one component among the components of FIG. 1, and the network 199 may further include at least one other network. According to an embodiment, the first communication processor (CP) 212, the second communication processor 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted or be included as part of the third RFIC 226.

The first communication processor 212 may establish a communication channel of a band that is to be used for wireless communication with the first network 292 or may support legacy network communication via the established communication channel. According to an embodiment, the first network may be a legacy network that includes second generation (2G), third generation (3G), fourth generation (4G), or long-term evolution (LTE) networks. The second communication processor 214 may establish a communication channel corresponding to a designated band (e.g., from about 6 GHz to about 60 GHz) among bands that are to be used for wireless communication with the second network 294 or may support fifth generation (5G) network communication via the established communication channel. According to an embodiment, the second network 294 may be a 5G network defined by the 3rd generation partnership project (3GPP). Additionally, according to an embodiment, the first communication processor 212 or the second communication processor 214 may establish a communication channel corresponding to another designated band (e.g., about 6 GHz or less) among the bands that are to be used for wireless communication with the second network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an US-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
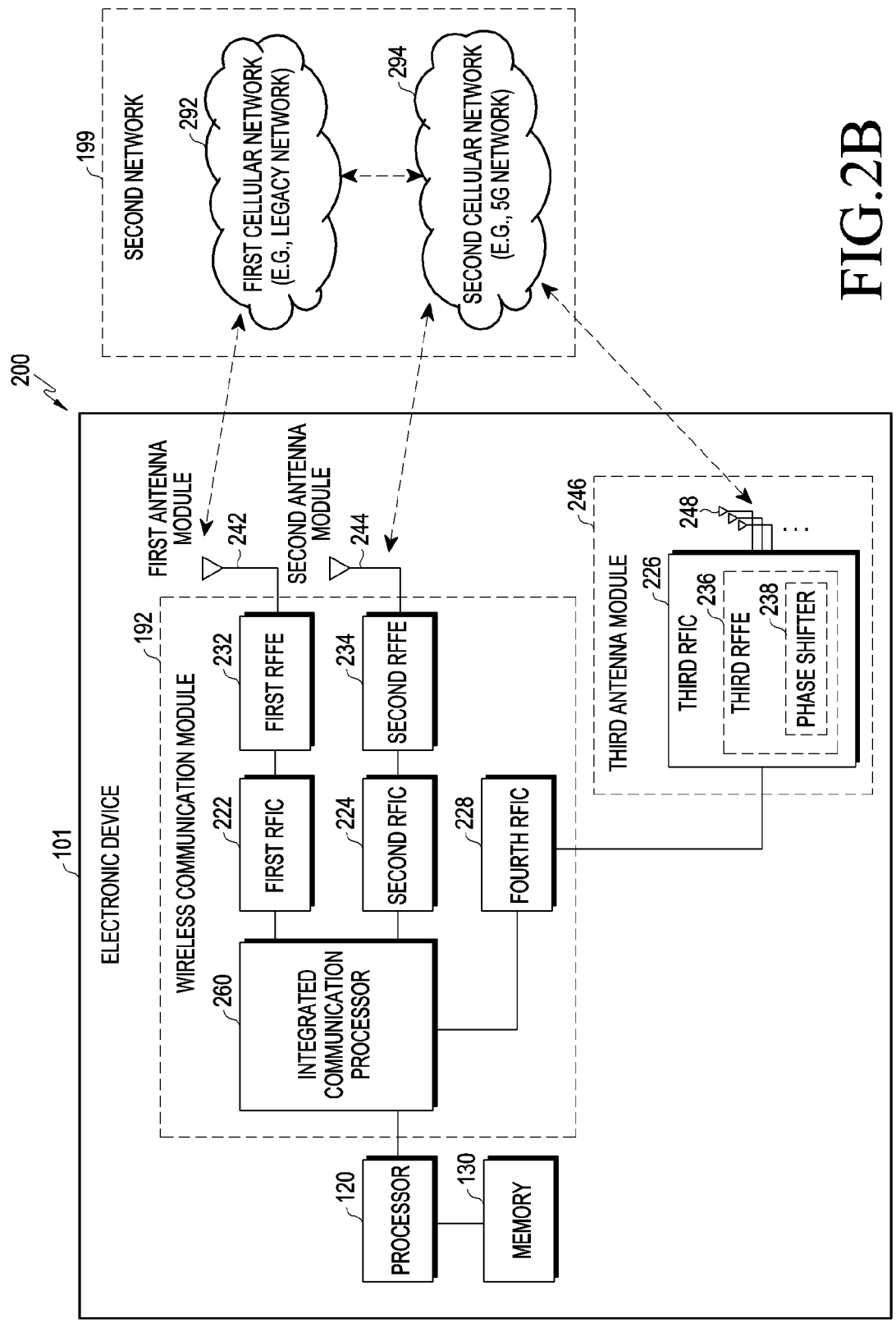
FIG. 2B illustrates a block diagram of an electronic device for supporting legacy network communication and 5G network communication according to an embodiment.

According to an embodiment, the first communication processor 212 and the second communication processor 214 may be implemented in a single chip or a single package. According to an embodiment, the first communication processor 212 or the second communication processor 214, along with the processor 120, an assistance processor 123, or communication module 190, may be formed in a single chip or single package. For example, as shown in FIG. 2B, an integrated communication processor 260 may support all of the functions for communication with the first cellular network and the second cellular network.

Upon transmission, the first RFIC 222 may convert a baseband signal generated by the first communication processor 212 into a radio frequency (RF) signal with a frequency ranging from about 700 MHz to about 3 GHz which is used by the first network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second network 294 (e.g., a 5G network). Upon receipt, the 5G Sub6 RF signal may be obtained from the second network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., from about 6 GHz to about 60 GHz) RF signal (hereinafter, "5G Above6 RF signal") that is to be used by the second network 294 (e.g., a 5G network). Upon receipt, the 5G Above6 RF signal may be obtained from the second network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second network 294 (e.g., a 5G network) may be operated independently (e.g., as standalone (SA)) from, or in connection (e.g., as non-standalone (NSA)) with the first network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

According to an embodiment, an electronic device comprises a first transceiver configured to transmit/receive data via a first communication network, a second transceiver configured to transmit/receive data via a second communication network, and at least one communication processor electrically connected with at least one of the first transceiver and the second transceiver, wherein the at least one communication processor is configured to identify transmission of transmission data via the first communication network, upon transmission of the transmission data via the first communication network, identify whether there is transmission data to be transmitted via the second communication network from a packet data convergence protocol (PDCP) buffer, and when it is identified that there is no transmission data to be transmitted via the second communication network, perform control to transmit the transmission data to be transmitted via the first communication network, via the first transceiver, based on second maximum transmission power larger than preset first maximum transmission power.

According to an embodiment, the at least one communication processor may be configured to, when it is identified that there is transmission data to be transmitted via the second communication network, perform control to transmit the transmission data to be transmitted via the first communication network, via the first transceiver based on, at least, the preset first maximum transmission power.

According to an embodiment, the at least one communication processor may be configured to identify whether there is transmission data to be transmitted via a long term evolution (LTE) communication network from an LTE PDCP buffer and transmit a result of the identification to a new radio (NR) media access control (MAC) entity.

According to an embodiment, the at least one communication processor may be configured to, when it is identified that there is no transmission data to be transmitted via the LTE communication network, transmit a flag indicating that there is no transmission data to the NR MAC entity.

According to an embodiment, the at least one communication processor may be configured to, when the NR MAC entity receives the flag indicating that there is no transmission data to be transmitted via the LTE communication network, perform control to transmit the transmission data to be transmitted via the first communication network, via the first transceiver.

According to an embodiment, the at least one communication processor may be configured to apply the second maximum transmission power considering a time when data is processed from an LTE PDCP layer to a physical layer.

According to an embodiment, the at least one communication processor may be configured to apply the second maximum transmission power further considering a retransmission processing time of the transmission data to be transmitted via the LTE communication network.

According to an embodiment, the at least one communication processor may be configured to, when it is identified that there is transmission data to be transmitted via the LTE communication network, transmit a flag indicating that there is transmission data to the NR MAC entity.

According to an embodiment, the at least one communication processor may be configured to, when the NR MAC entity receives the flag indicating that there is transmission data to be transmitted via the LTE communication network, perform control to transmit the transmission data to be transmitted via the first communication network, via the first transceiver based on the first maximum transmission power.

According to an embodiment, the at least one communication processor may be configured to apply the first maximum transmission power considering a time when data is processed from an LTE PDCP layer to a physical layer.

According to an embodiment, the at least one communication processor may be configured to identify a transmission time of transmission data to be transmitted via the first communication network based on scheduling information for transmission data received from a base station and identify whether there is transmission data to be transmitted via the second communication network at the identified transmission time.

Figure 3:
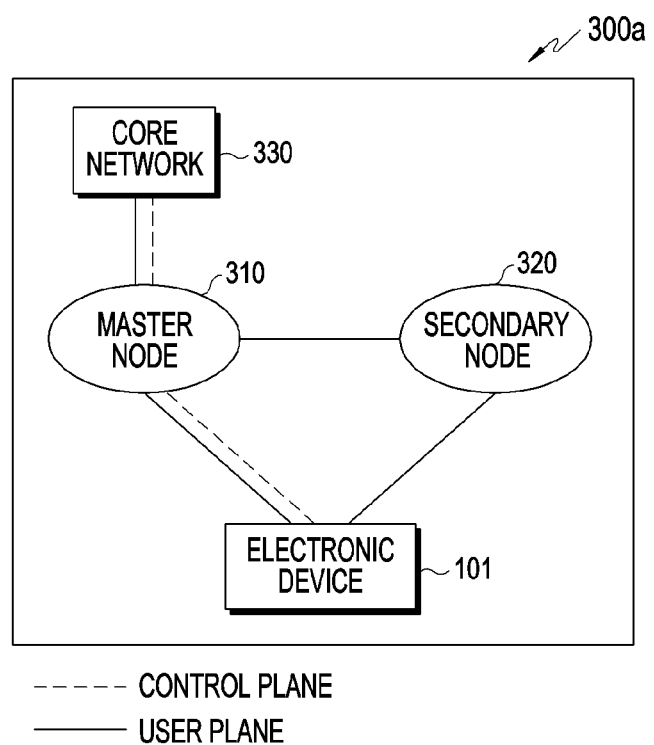
FIG. 3 illustrates a view of wireless communication systems providing a legacy communication network and/or a 5G communication network according to an embodiment.

FIG. 3 illustrates a view of a wireless communication system providing a legacy communication network and/or a 5G communication network according to embodiments. Referring to FIG. 3, the network environment 300a may include at least one of a legacy network and a 5G network. The legacy network, e.g., the network environment 300a, may include, e.g., a 3GPP-standard 4G or LTE base station (e.g., an eNodeB (eNB)) that supports radio access with the electronic device 101 and an evolved packet core (EPC) that manages 4G communication. The 5G network may include, e.g., a new radio (NR) base station (e.g., a gNodeB (gNB)) that supports radio access with the electronic device 101 and a 5th generation core (5GC) that manages 5G communication for the electronic device 101.

According to an embodiment, the electronic device 101 may transmit or receive control messages and user data via legacy communication and/or 5G communication. The control messages may include, e.g., messages related to at least one of security control, bearer setup, authentication, registration, or mobility management for the electronic device 101. The user data may mean, e.g., user data except for control messages transmitted or received between the electronic device 101 and the core network 330 (e.g., the EPC).

Referring to FIG. 3, according to an embodiment, the electronic device 101 may transmit or receive at least one of a control message or user data to/from at least part (e.g., the NR base station or 5GC) of the 5G network via at least part (e.g., the LTE base station or EPC) of the legacy network.

According to an embodiment, the network environment 300a may include a network environment that provides wireless communication dual connectivity (DC) to the LTE base station and the NR base station and transmits or receives control messages to/from the electronic device 101 via one core network 330 of the EPC or the 5GC.

According to an embodiment, in the DC environment, one of the LTE base station or the NR base station may operate as a master node (MN) 310, and the other as a secondary node (SN) 320. The MN 310 may be connected with the core network 330 to transmit or receive control messages. The MN 310 and the SN 320 may be connected with each other via a network interface to transmit or receive messages related to radio resource (e.g., communication channel) management therebetween.

According to an embodiment, the MN 310 may include the LTE base station, the SN may include the NR base station, and the core network 330 may include the EPC. For example, control messages may be transmitted/received via the LTE base station and the EPC, and user data may be transmitted/received via at least one of the LTE base station or the NR base station.

According to an embodiment, the MN 310 may include the NR base station, the SN 320 may include the LTE base station, and the core network 330 may include the 5GC. For example, control messages may be transmitted/received via the NR base station and the 5GC, and user data may be transmitted/received via at least one of the LTE base station or the NR base station.

According to an embodiment, the electronic device 101 may be registered in at least one of the EPC or the 5GC to transmit or receive control messages.

According to an embodiment, the EPC or the 5GC may interwork with each other to manage communication for the electronic device 101. For example, mobility information for the electronic device 101 may be transmitted or received via the interface between the EPC and the 5GC.

As set forth above, dual connectivity via the LTE base station and the NR base station may be referred to as E-UTRA new radio dual connectivity (EN-DC).

Figure 4:
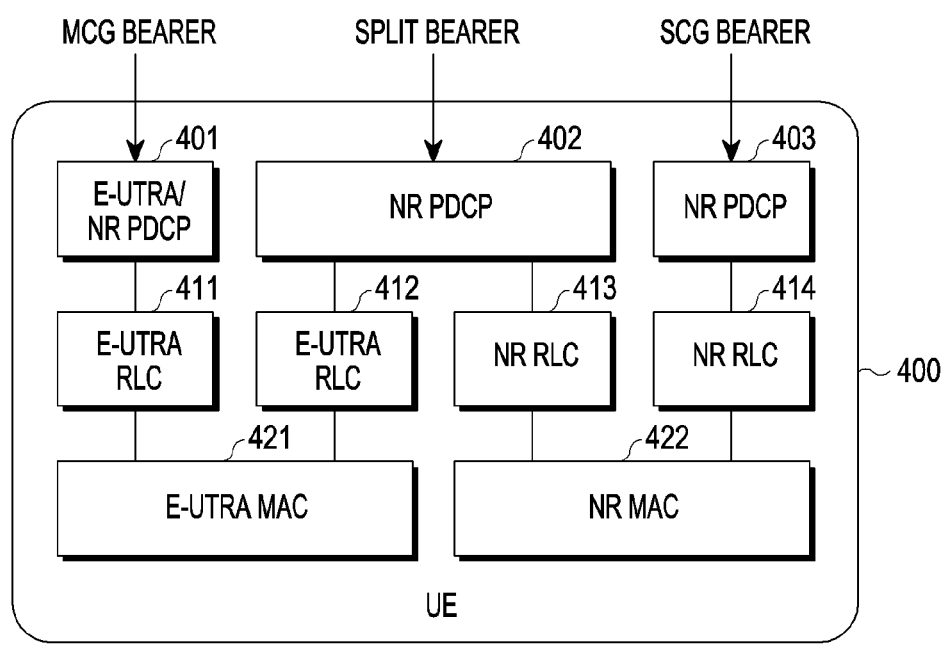
FIG. 4 illustrates a view of a bearer in a UE according to an embodiment.

FIG. 4 illustrates a view of a bearer in a UE according to an embodiment.

Bearers possible in the 5G non-standalone network environment (e.g., the network environment 300a of FIG. 3) may include a master cell group (MCG) bearer, a secondary cell group (SCG) bearer, and a split bearer. An E-UTRA/NR PDCP entity 401 and NR PDCP entities 402 and 430 may be configured in a user equipment (UE) 400. E-UTRA radio link control (RLC) entities 411 and 412 and NR RLC entities 413 and 414 may be configured in the UE 400. An E-UTRA MAC entity 421 and an NR MAC entity 422 may be configured in the UE 400. The UE may be a user device capable of communicating with base stations, and the UE may be interchangeably used with the electronic device 101 of FIG. 1. For example, when the UE performs a specific operation according to an embodiment, this may mean that at least one component of the electronic device 101 performs the specific operation.

The MCG may correspond to, e.g., the main node (MN) 310 of FIG. 3, and the SCG may correspond to the secondary node (SN) 320 of FIG. 3. The UE 400, if a node for communication is determined, may configure various entities as shown in FIG. 4 for communication with the determined node (e.g., a base station). The PDCP layer entities 401, 402, and 403 may receive data (e.g., PDCP SDU corresponding to IP packet) and output converted data (e.g., PDCP protocol data unit (PDU)) to which additional information (e.g., header information) has been applied. RLC layer entities 411, 412, 413, and 414 may receive the converted data (e.g., PDCP PDU) from the PDCP layer entities 401, 402, and 403 and output converted data (e.g., RLC PDU) to which additional information (e.g., header information) has been applied. MAC layer entities 421 and 422 may receive the converted data (e.g., RLC PDU) from the RLC layer entities 411, 412, 413, and 414 and output converted data (e.g., MAC PDU) to which additional information (e.g., header information) has been applied and transfer to the physical layer (not shown).

The MCG bearer may be associated with a path (or data) through which data may be transmitted/received only using the entity or resources corresponding to the MN in dual connectivity (DC). The SCG bearer may be associated with a path (or data) through which data may be transmitted/received only using the entity or resources corresponding to the SN in dual connectivity. The split bearer may be associated with a path (or data) through which data may be transmitted/received using the entity or resources corresponding to the MN and the entity or resources corresponding to the SN in dual connectivity. Thus, as shown in FIG. 4, the split bearer may be associated with all of the E-UTRA RLC entity 412 and the NR RLC entity 413 and the E-UTRA MAC entity 421 and NR MAC entity 422 via the NR PDCD entity 402.

Described below is a method of controlling power in an electronic device supporting dual connectivity (e.g., EN-DC). In the following description, the EN-DC is described as a specific example of dual connectivity. However, the disclosure is not limited to the EN-DC but may rather apply to other various types of dual connectivity.

In the EN-DC-supporting electronic device, a maximum transmission power (hereinafter, a first maximum transmission power) may be set for the power of transmission signals transmitted via each communication network. For example, in the EN-DC-supporting electronic device, the NR transmission power may be set to a maximum of 20 dBm, and the LTE transmission power may be set to a maximum of 20 dBm.

When the NR transmission signal and the LTE transmission signal are simultaneously transmitted, the sum of the transmission signals may be limited to the preset maximum transmission power ($P_{cmax}$). Unless the electronic device supports dynamic power sharing (DPS), the maximum power of each transmission signal may be limited considering the maximum transmission power ($P_{cmax}$) which is a limit imposed when the simultaneous transmission is performed. For example, if the maximum transmission power when the two transmission signals are simultaneously transmitted is set to 23 dBm, the maximum transmission power of each transmission signal (e.g., LTE transmission signal and NR transmission signal) may be set to $P_{LTE}=P_{NR}=20$ dBm. As such, since the maximum transmission power of each transmission signal is limited to 20 dBm, not 23 dBm, more problems may arise than in electronic devices using not dual connectivity but a single communication network. For example, due to failure to secure sufficient uplink transmission power, the ACK/NACK signal or scheduling request information transmitted from the electronic device to the base station may be lost, and the ACK signal transmitted from the electronic device may not be normally received by the base station, ending up causing the base station to re-request the data.

In various embodiments described below, the transmission power of transmission data transmitted via the first communication network is determined based on the presence or absence of transmission data to be transmitted via the second communication network so that transmission data may be transmitted with second maximum transmission power (e.g., 23 dBm) which is larger than preset first maximum transmission power (e.g., 20 dBm). According to an embodiment, whether there is transmission data to be transmitted via the second communication network may be identified through the presence or absence of data stored in the PDCP buffer.

Figure 5:
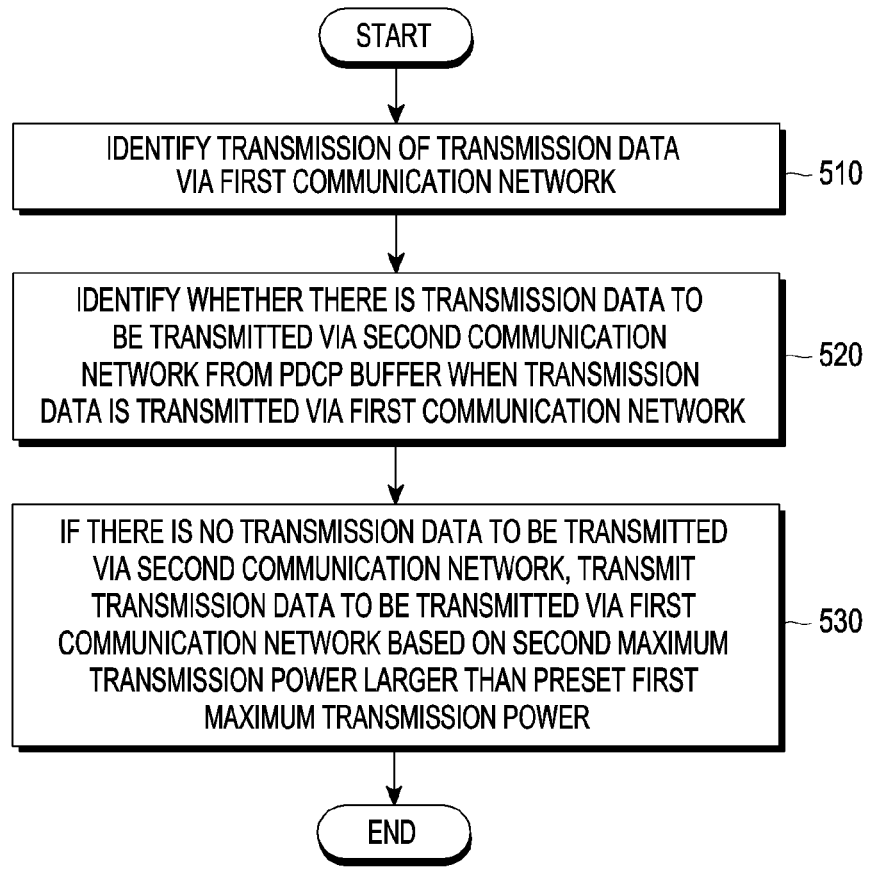
FIG. 5 illustrates a flowchart of a method of operating an electronic device according to an embodiment.

FIG. 5 illustrates a flowchart of a method of operating an electronic device according to an embodiment. Referring to FIG. 5, in operation 510, according to an embodiment, an electronic device (e.g., the electronic device 101 of FIG. 1, 2A, or 2B) may identify transmission of data to be transmitted via a first communication network (e.g., an NR communication network). Whether transmission of transmission data to be transmitted via the first communication network occurs may be identified via a variation in the data stored in the buffer that belongs to the MAC entity corresponding to the first communication network. According to an embodiment, the transmission of transmission data to be transmitted via the first communication network may be identified at the time of transmission of uplink data in a time division duplex (TDD) system.

According to an embodiment, in operation 520, if the electronic device 101 determines that transmission data is transmitted via the first communication network, the electronic device 101 may identify whether there is transmission data to be transmitted via a second communication network (e.g., an LTE communication network). The presence or absence of transmission data to be transmitted via the second communication network may be identified via the PDCP buffer (e.g., an NR PDCP buffer) corresponding to the first communication network or the PDCP buffer (e.g., an LTE PDCP buffer) corresponding to the second communication network. According to an embodiment, the transmission of transmission data to be transmitted via the second communication network may be identified at the time of transmission of transmission data via the first communication network. According to an embodiment, the transmission of transmission data to be transmitted via the second communication network may be identified based on the time of transmission of transmission data (e.g., uplink data) to be transmitted via the first communication network which is identified from TDD scheduling information received from the base station, and its relevant embodiments are described below in connection with FIG. 8.

According to an embodiment, in operation 530, if there is determined to be no transmission data to be transmitted via the second communication network, the electronic device 101 may transmit the transmission data to be transmitted via the first communication network based on second maximum transmission power (e.g., 23 dBm) larger than first maximum transmission power (e.g., 20 dBm) preset for the first communication network.

According to an embodiment, if there is determined to be transmission data to be transmitted via the second communication network, the electronic device 101 may transmit the transmission data to be transmitted via the first communication network based on the first maximum transmission power (e.g., 20 dBm) preset for the first communication network. If transmission data to be transmitted via the second communication network and transmission data to be transmitted via the first communication network simultaneously occur, the transmission data to be transmitted via the first communication network and the transmission data to be transmitted via the second communication network may influence each other. In this case, thus, transmission power may be set considering intermodulate distortion (IMD) or spurious.

According to an embodiment, a method of controlling transmission power by an electronic device comprises identifying transmission of transmission data via a first communication network, upon transmission of the transmission data via the first communication network, identifying whether there is transmission data to be transmitted via a second communication network from a PDCP buffer, and when it is identified that there is no transmission data to be transmitted via the second communication network, transmit the transmission data to be transmitted via the first communication network, based on second maximum transmission power larger than preset first maximum transmission power.

According to an embodiment, the method may comprise identifying whether there is transmission data to be transmitted via an LTE communication network from an LTE PDCP buffer and transmitting a result of the identification to an NR MAC entity.

According to an embodiment, the method may further comprise, when it is identified that there is no transmission data to be transmitted via the LTE communication network, transmitting a flag indicating that there is no transmission data to the NR MAC entity.

According to an embodiment, the method may further comprise, when the NR MAC entity receives the flag indicating that there is no transmission data to be transmitted via the LTE communication network, transmitting the transmission data to be transmitted via the first communication network, via a first transceiver based on the second maximum transmission power.

According to an embodiment, the method may further comprise applying the second maximum transmission power considering a time when data is processed from an LTE PDCP layer to a physical layer.

According to an embodiment, the method may further comprise applying the second maximum transmission power further considering a retransmission processing time of the transmission data to be transmitted via the LTE communication network.

According to an embodiment, the method may further comprise, when it is identified that there is transmission data to be transmitted via the LTE communication network, transmitting a flag indicating that there is transmission data to the NR MAC entity.

According to an embodiment, the method may further comprise, when the NR MAC entity receives the flag indicating that there is transmission data to be transmitted via the LTE communication network, transmitting the transmission data to be transmitted via the first communication network, via a first transceiver based on the first maximum transmission power.

According to an embodiment, the method may further comprise applying the first maximum transmission power considering a time when data is processed from an LTE PDCP layer to a physical layer.

Figure 6A:
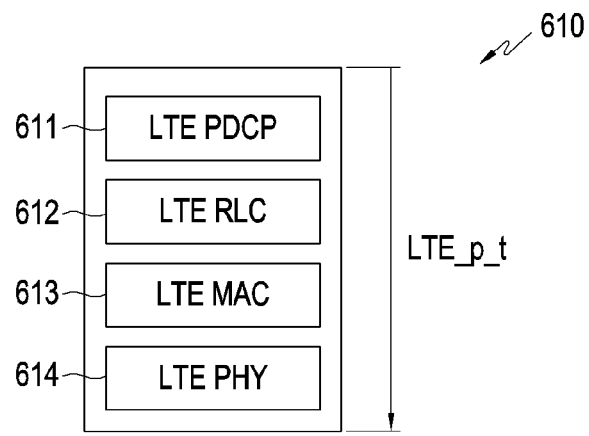
FIG. 6A illustrates a view of a processing time of an LTE communication processor according to an embodiment.

FIG. 6A illustrates a view of a processing time of an LTE communication processor according to an embodiment. Referring to FIG. 6A, an LTE communication processor 610 may include (or execute) an LTE PDCP entity 611, an LTE RLC entity 612, an LTE MAC entity 613, and an LTE PHY entity 614. The functions of each entity are described below in detail with reference to FIG. 9A. According to an embodiment, the processing time LTEp-t of the LTE communication processor may be defined as the time when packet data to be transmitted is processed via the LTE PDCP entity 611, the LTE RLC entity 612, the LTE MAC entity 613, or the LTE PHY entity 614.

Figure 6B:
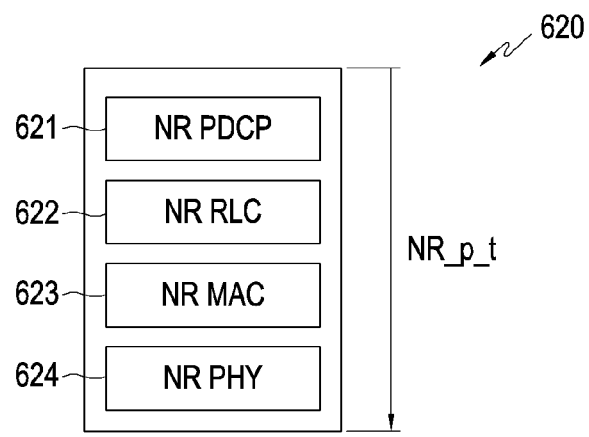
FIG. 6B illustrates a view of a processing time of an NR communication processor according to an embodiment.

FIG. 6B illustrates a view of a processing time of an NR communication processor according to an embodiment. Referring to FIG. 6B, an NR communication processor 620 may include (or execute) an NR PDCP entity 621, an NR RLC entity 622, an NR MAC entity 623, and an NR PHY entity 624. The functions of each entity are described below in detail with reference to FIG. 9B. According to an embodiment, the processing time NR_p-t of the NR communication processor may be defined as the time when packet data to be transmitted is processed via the NR PDCP entity 621, the NR RLC entity 622, the NR MAC entity 623, or the NR PHY entity 624.

Figures 7A, 7B:
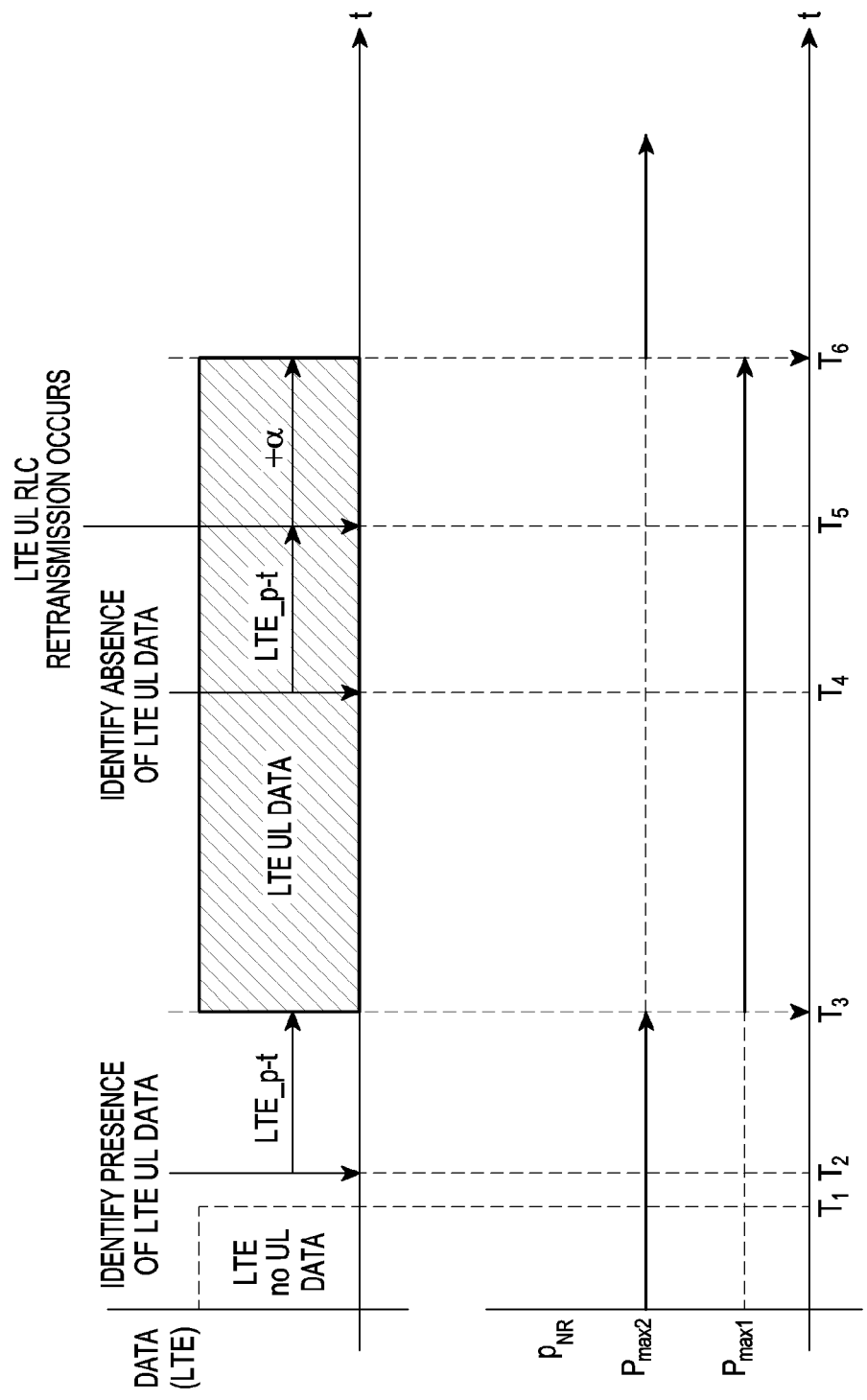
FIGS. 7A and 7B illustrate a view of a power control procedure of an electronic device according to an embodiment.

FIGS. 7A and 7B illustrate a view of a power control procedure of an electronic device according to an embodiment. According to an embodiment, FIG. 7A illustrates whether there is LTE transmission data over time, and FIG. 7B illustrates the transmission power of NR transmission data over time. Referring to FIGS. 7A and 7B, according to an embodiment, an electronic device (e.g., the electronic device 101 of FIG. 1, 2A, or 2B) (e.g., a communication processor (e.g., the communication processor 212, 214, or 260 of FIG. 2a or 2b) of an electronic device) may perform control to increase the transmission power of NR transmission data within the processing time LTE_p_t required for actual transmission in the LTE PHY from the time of identifying an occurrence of LTE transmission data (or presence of LTE UE data) in the LTE PDCP buffer while the LTE PDCP buffer lacks transmission data). According to an embodiment, the communication processor may perform control to increase the transmission power of NR transmission data considering the LTE UL RLC retransmission time (marked "+α" in FIG. 7A) and/or the processing time LTE_p_t required for transmission of the remaining transmission data in the LTE PHY from the time (marked "identify absence of LTE UL data" in FIG. 7A) of sensing the absence of transmission data while the LTE PDCP buffer has transmission data. According to an embodiment, the electronic device may determine the time of increasing the transmission power of NR transmission data considering the maximum number of times of LTE UL RLC retransmission.

According to an embodiment, if no LTE transmission data is present at time $T_1$ (marked "LTE no UL data" in FIG. 7A), the electronic device may perform control to transmit transmission data with second maximum transmission power (e.g., 23 dBm) (marked "$P_{max2}$" in FIG. 7B) which is larger than designated first maximum transmission power (e.g., 20 dBm) (marked "$P_{max1}$" in FIG. 7B).

According to an embodiment, upon identifying that there is LTE transmission data at time $T_2$ via the PDCP buffer (e.g., LTE PDCP buffer or NR PDCP buffer, the electronic device—since, the LTE transmission data may be transmitted at least after the LTE processing time LTE_p_t elapses—may adjust the transmission power of NR transmission data from the second maximum transmission power $P_{max2}$ to the first maximum transmission power $P_{max1}$ at time $T_3$ to which the LTE processing time has been applied.

According to an embodiment, after adjusting the transmission power of NR transmission data at time $T_3$, the electronic device may continue to identify the presence or absence of LTE transmission data via the PDCP buffer.

According to an embodiment, if it is identified that there is no LTE transmission data at time $T_4$ via the PDCP buffer (e.g., LTE PDCP buffer or NR PDCP buffer), no LTE transmission data which is transmitted via the actual antenna is present at least after the LTE processing time LTE_p_t considering the LTE processing time LTE_p_t. Thus, although not shown, the electronic device may adjust the transmission power of NR transmission data from the first maximum transmission power $P_{max1}$ to the second maximum transmission power $P_{max2}$ at time $T_5$ to which the LTE processing time has been applied.

According to an embodiment, since the lower layer (e.g., the RLC layer, MAC layer, or PHY layer) has a chance of processing the remaining data although the PDCP buffer lacks LTE transmission data, the electronic device may vary the transmission power of NR transmission data after processing the remaining data via the lower layer. According to an embodiment, since there may occur RLC retransmission of the LTE transmission data which has already been transmitted, even after all of the remaining data is processed via the higher layer, the electronic device may vary the transmission power of NR transmission data after a time (α) considered for the RLC retransmission elapses. For example, upon determining that there is no LTE transmission data at time $T_4$, via the PDCP buffer, the electronic device may maintain the current transmission power until $T_5$ when the LTE processing time has elapsed, considering the processing of the remaining data, and the electronic device may then adjust the transmission power of NR transmission data from the first maximum transmission power $P_{max1}$ to the second maximum transmission power $P_{max2}$ at time $T_6$ considered for RLC retransmission.

According to an embodiment, the time (α) considered for RLC retransmission may be set via RLC retransmission-related data received from the base station. For example, the following RLC settings may be received from the base station.

--- rlc-Config, am (0)
    am
        ul-AM-RLC
            t-PollRetransmit, ms50 (9)
            pollPDU, p16 (2)
            pollByte, kB50 (1)
            maxRetxThreshold, t32 (7)

---

According to an embodiment, the RLC settings reveal the maximum value of LTE UL RLC retransmission. According to an embodiment, the time (α) considered for RLC retransmission from the RLC settings may be determined by Equation 1 below.

$$\alpha = \text{t-PollRetransmit} \times \text{max RetxThreshold} \quad \text{Equation 1}$$

In Equation 1 above, "t-PollRetransmit" denotes the poll bit retransmission period, and "maxRetxThreshold" may denote the number of times of retransmission.

According to an embodiment, upon identifying that there is data to be transmitted via LTE, the electronic device may perform control to decrease the maximum transmission power of NR transmission data without applying the LTE processing time (e.g., LTE_p-t=0).

According to an embodiment, upon identifying that there is no data to be transmitted via LTE, the electronic device may perform control to increase the maximum transmission power of NR transmission data without applying the time considered for RLC retransmission (e.g., α=0)

Figure 8:
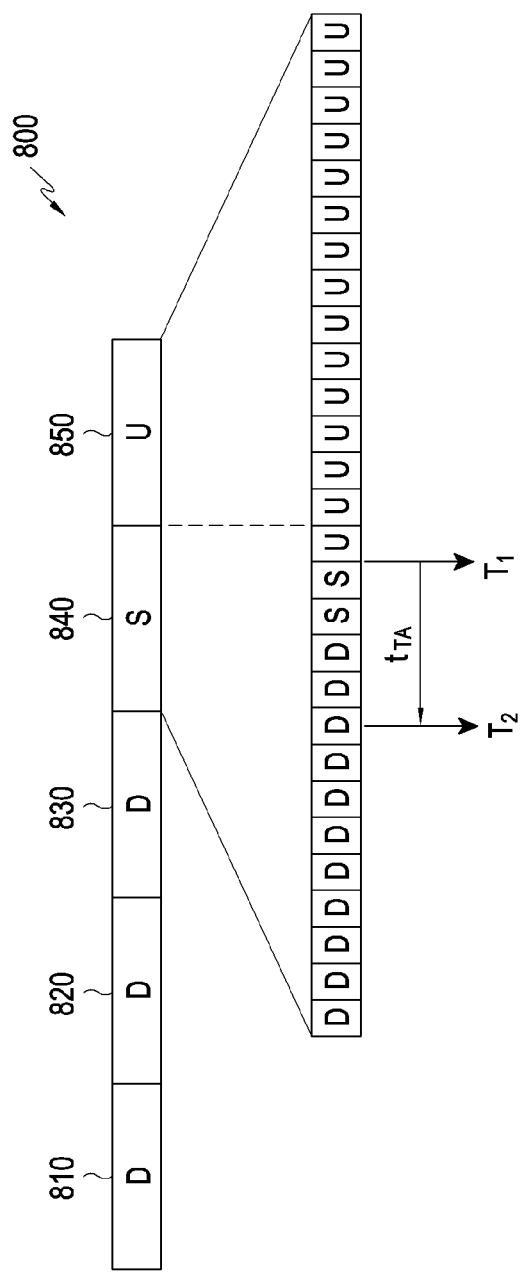
FIG. 8 illustrates a view of a transmission time of transmission data of an electronic device according to an embodiment.

FIG. 8 illustrates a view of a transmission time of transmission data of an electronic device according to an embodiment.

According to an embodiment, an electronic device (e.g., the electronic device 101 of FIG. 1, 2A, or 2B) (e.g., a communication processor (e.g., the communication processor 212, 214, or 260 of FIG. 2a or 2b) of an electronic device) may determine the time of operation for sensing whether there is actual LTE transmission data depending on whether NR transmission data is transmitted. For example, it may be efficient to identify the presence or absence of LTE transmission data only when there is NR transmission data. Thus, the electronic device may be configured to identify whether there is LTE transmission data only when the NR transmission data exists.

Referring to FIG. 8, according to an embodiment, the electronic device may perform control to transmit NR transmission data at times allocated according to scheduling information received from the base station. For example, a resource 800 allocated by the base station for transmission/reception of NR data may include a plurality of slots 810, 820, 830, 840, and 850 as shown in FIG. 8. If NR data is transmitted in a TDD scheme, the electronic device may perform control to sequentially allocate downlink slots (marked 'D" in FIGS. 8) 810, 820, and 830, a flexible slot (marked "S" in FIG. 8) 840, and an uplink slot (marked "U" in FIG. 8) 850. Each slot may include a plurality of (e.g., 14) symbols. For example, each downlink slot 810, 820, and 830 may be assigned 14 downlink symbols, the flexible slot 840 may be assigned a combination of the downlink and uplink symbols among the 14 symbols, and the uplink slot 850 may be allocated 14 uplink symbols.

According to an embodiment, the first symbol assigned uplink data in FIG. 8 is the 14th symbol of the flexible slot 840, and the transmission time of the 14th symbol is denoted T1. According to an embodiment, the electronic device may sense whether there is LTE transmission data from time T1 when NR transmission data is transmitted.

According to an embodiment, the uplink transmission data transmitted from the electronic device to the base station (e.g., an NR base station) may encounter a propagation delay depending on the distance between the electronic device and the base station. For example, far away from the base station, the electronic device may experience a relatively large propagation delay and, closer, a relatively small delay. Given the propagation delay, the base station may provide a timing advance offset to apply a timing advance (TA) to each electronic device. For example, the timing advance offset may be transmitted via the MAC control element (CE) of the DL-SCH channel transmitted from the base station. Each electronic device may transmit transmission data by the timing advance offset-applied timing advance time (tTA) earlier.

According to an embodiment, the electronic device may sense the presence or absence of LTE transmission data from the actual transmission time T2 that results from applying the timing advance time (tTA) to the time $T_1$ of transmission of NR transmission data. The actual transmission tme T2 may be calculated as T1−tTA.

According to an embodiment, the electronic device may generate a task which consumes relatively little power and monitor whether the NR PDCP buffer has NR transmission data in each uplink scheduling period of FIG. 8. If, as a result of the monitoring, the NR PDCP buffer has NR transmission data, it may be identified whether LTE transmission data is present.

Figure 9A:
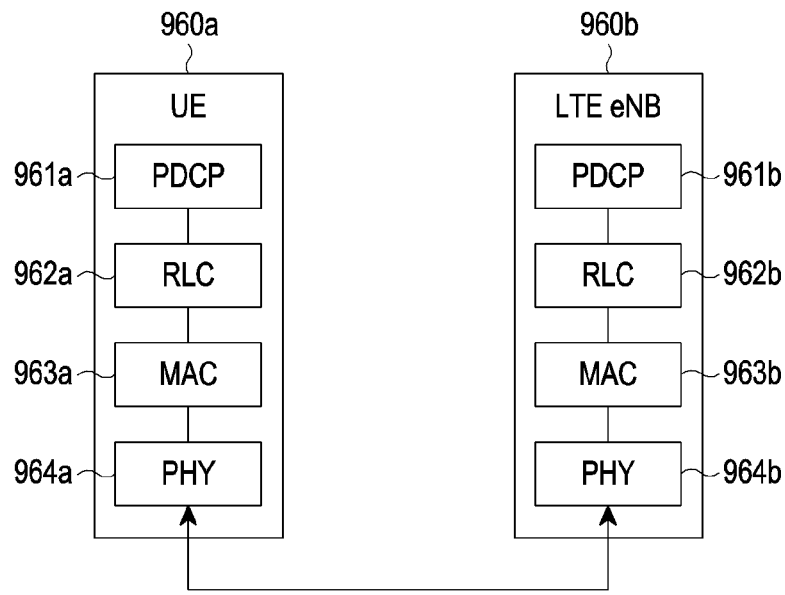
FIG. 9A illustrates a view of a radio protocol structure in an LTE system.

FIG. 9A illustrates a view of a radio protocol structure in an LTE system.

Referring to FIG. 9A, according to an embodiment, an LTE system radio protocol stack may packet data convergence protocol (PDCP) entities 961a and 961b, radio link control (RLC) entities 962a and 962b, medium access control (MAC) entities 963a and 963b, and physical (PHY) entities 964a and 964b in a UE 960a and an LTE eNB 960b, respectively.

According to an embodiment, the PDCP entities 961a and 961b may be in charge of IP header compression/restoration. The major functions of the PDCP may be summarized as follows.
 header compression and decompression (ROHC only)
 transfer of user data
 in-sequence delivery of upper layer PDUs at PDCP re-establishment procedure for RLC AM
 for split bearers in DC (only support for RLC AM), PDCP PDU routing for transmission and PDCP PDU reordering for reception
 duplicate detection of lower layer SDUs at PDCP re-establishment procedure for RLC AM
 retransmission of PDCP SDUs at handover and, for split bearers in DC, of PDCP PDUs at PDCP data-recovery procedure, for RLC AM
 ciphering and deciphering
 timer-based SDU discard in uplink According to an embodiment, radio link control (hereinafter, "RLC") 962a and 962b may reconstruct the PDCP packet data unit (PDU) into proper sizes and perform, e.g., ARQ operation. The major functions of the RLC may be summarized as follows.
 transfer of upper layer PDUs
 error correction through ARQ (only for AM data transfer)
 concatenation, segmentation and reassembly of RLC SDUs (only for UM and AM data transfer)
 re-segmentation of RLC data PDUs (only for AM data transfer)
 reordering of RLC data PDUs (only for UM and AM data transfer)
 duplicate detection (only for UM and AM data transfer)
 protocol error detection (only for AM data transfer)
 RLC SDU discard (only for UM and AM data transfer)
 RLC re-establishment According to an embodiment, the MACs 963a and 963b are connected to several RLC layer devices configured in one UE and may multiplex RLC PDUs into a MAC PDU and demultiplex RCL PDUs from the MAC PDU. The major functions of the MAC may be summarized as follows.
 mapping between logical channels and transport channels
 multiplexing/demultiplexing of MAC SDUs belonging to one or different logical channels into/from transport blocks (TB) delivered to/from the physical layer on transport channels
 scheduling information reporting
 error correction through HARQ
 priority handling between logical channels of one UE
 priority handling between UEs by means of dynamic scheduling
 MBMS service identification
 transport format selection
 padding According to an embodiment, the PHYs 964a and 964b channel-code and modulate higher layer data into OFDM symbols, transmit the OFDM symbols through a wireless channel or demodulate OFDM symbols received through a wireless channel, channel-decode and transfer the same to a higher layer.

Figure 9B:
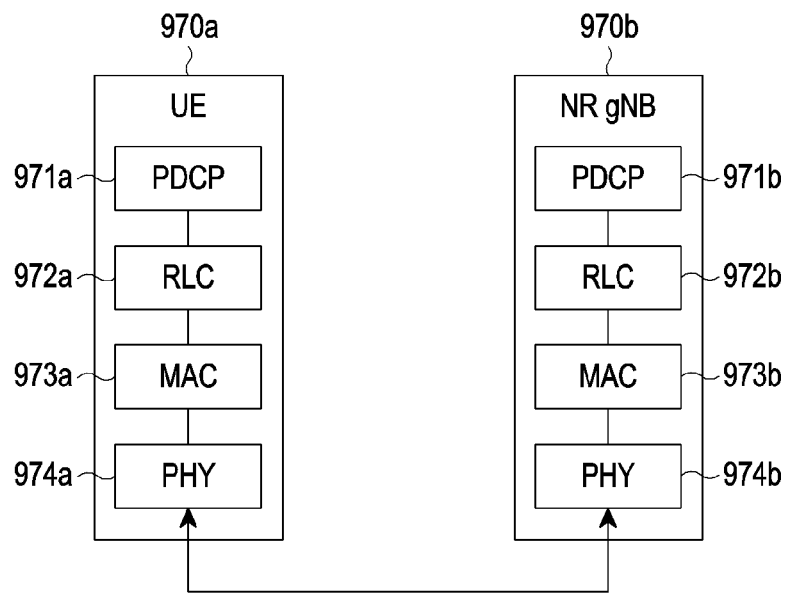
FIG. 9B illustrates a view of a radio protocol structure of a next-generation mobile communication system according to an embodiment.

FIG. 9B illustrates a view of a radio protocol structure of a next-generation mobile communication system according to an embodiment.

Referring to FIG. 9B, according to an embodiment, a radio protocol stack of a next-generation mobile communication system may include NR PDCPs 971a and 971b, NR RLCs 972a and 972b, NR MACs 973a and 973b, and NR PHYs 974a and 974b in a UE 970a and an NR base station (gNB) 970b, respectively. Although not shown, the radio protocol stack of the next-generation mobile communication system may further include a service data adaptation protocol (SDAP) in each of the UE 970a and the NR base station (gNB) 970b. The SDAP may manage the allocation of radio bearers based on the quality-of-service (QoS) of user data.

According to an embodiment, the major functions of the NR PDCPs 971a and 971b may include some of the following ones.
 header compression and decompression (ROHC only)
 transfer of user data
 in-sequence delivery of upper layer PDUs
 PDCP PDU reordering for reception
 duplicate detection of lower layer SDUs
 retransmission of PDCP SDUs
 ciphering and deciphering
 timer-based SDU discard in uplink According to an embodiment, the reordering by the NR PDCP refers to reordering PDCP PDUs received by the lower layer based on the PDCP sequence numbers (SNs) and may include transferring the data to the higher layer in the order reordered, recording PDCP PDUs missed by reordering, reporting the state of the missing PDCP PDUs to the transmit part, and requesting to retransmit the missing PDCP PDUs.

According to an embodiment, the major functions of the NR RLCs 972a and 972b may include some of the following ones.

transfer of upper layer PDUs
    in-sequence delivery of upper layer PDUs
    out-of-sequence delivery of upper layer PDUs
    error correction through ARQ
    concatenation, segmentation and reassembly of RLC SDUs
    re-segmentation of RLC data PDUs
    reordering of RLC data PDUs
    duplicate detection
    protocol error detection
    RLC SDU discard
    RLC re-establishment According to an embodiment, the in-sequence delivery by the NR RLC refers to transferring the RLC SDUs received from the lower layer to the higher layer in order and, if one original RLC SDU is split into several RLC SDUs that are then received, the in-sequence delivery may include reassembling and transferring them, reordering the received RLC PDUs based on the RLC SNs or PDCP SNs, recording the RLC PDUs missed by reordering, reporting the state of the missing RLC PDUs to the transmit part, and requesting to retransmit the missing RLC PDUs and, if there are missing RLC SDUs, the in-sequence delivery may include transferring only RLC SDUs before the missing RLC SDUs to the higher layer in order. Although there are missing RLC SDUs, if a predetermined timer has expired, the in-sequence delivery may include transferring all of the RLC SDUs received before the timer starts to the higher layer in order. Or, although there are missing RLC SDUs, if the predetermined timer has expired, the in-sequence delivery may include transferring all of the RLC SDUs received thus far to the higher layer in order. The out-of-sequence delivery by the NR RLC refers to immediately transferring the RLC SDUs received from the lower layer to the higher layer regardless of order and, if one original RLC SDU is split into several RLC SDUs that are then received, the out-of-sequence delivery may include reassembling and transferring them and storing the RLC SNs or PDCP SNs of the received RLC PDUs, ordering them, and recording missing RLC PDUs.

According to an embodiment, the NR MACs 973a and 973b may be connected to several NR RLC layers configured in one UE, and the major functions of the NR MAC may include some of the following functions.

mapping between logical channels and transport channels
    multiplexing/demultiplexing of MAC SDUs
    scheduling information reporting
    error correction through HARQ
    priority handling between logical channels of one UE
    priority handling between UEs by means of dynamic scheduling
    MBMS service identification
    transport format selection
    padding According to an embodiment, the NR PHYs 974a and 974b channel-code and modulate higher layer data into OFDM symbols, transmit the OFDM symbols through a wireless channel or demodulate OFDM symbols received through a wireless channel, channel-decode and transfer the same to a higher layer.

According to an embodiment, information that may be included in the MAC header is described below with reference to Table 1.

TABLE 1

| Variables | Purposes |
|---|---|
| LCID | LCID may refer to the identifier of the RLC entity that has generated the RLC PDU (or MAC SDU) received from the higher layer. Or, LCID may refer to the MAC control element (CE) or padding. For this, different definitions may be made depending on channels. For example, different definitions may be made depending on the DL-SCH, UL-SCH, and MCH. |
| L | This refers to the length of MAC SDU and may denote the length of MAC CE which varies in length. For MAC CEs with a fixed length, the L-field may be omitted. For some reasons, the L-field may be left out. The reasons may include when the size of MAC SDU is fixed, when the transmit part notifies the receive part of the size of MAC PDU, or when the length may be calculated on the receive part. |
| F | This refers to the size of the L-field. Absent the L-field, this may be omitted and, if the F-field exists, the size of the L-field may be limited to a predetermined size. |
| F2 | This refers to the size of the L-field. Absent the L-field, this may be omitted and, if the F2-field exists, the size of the L-field may be limited to a size different than the size of the F-field. For example, the F2-field may indicate a size larger than the F-field. |
| E | This refers to whether the MAC header includes other headers. For example, if this indicates 1, variables of another MAC header may come thereafter. However, if it is 0, it may be followed by the MAC SDU, MAC CE, or padding. |
| R | This is a reserved bit. |

Figure 9C:
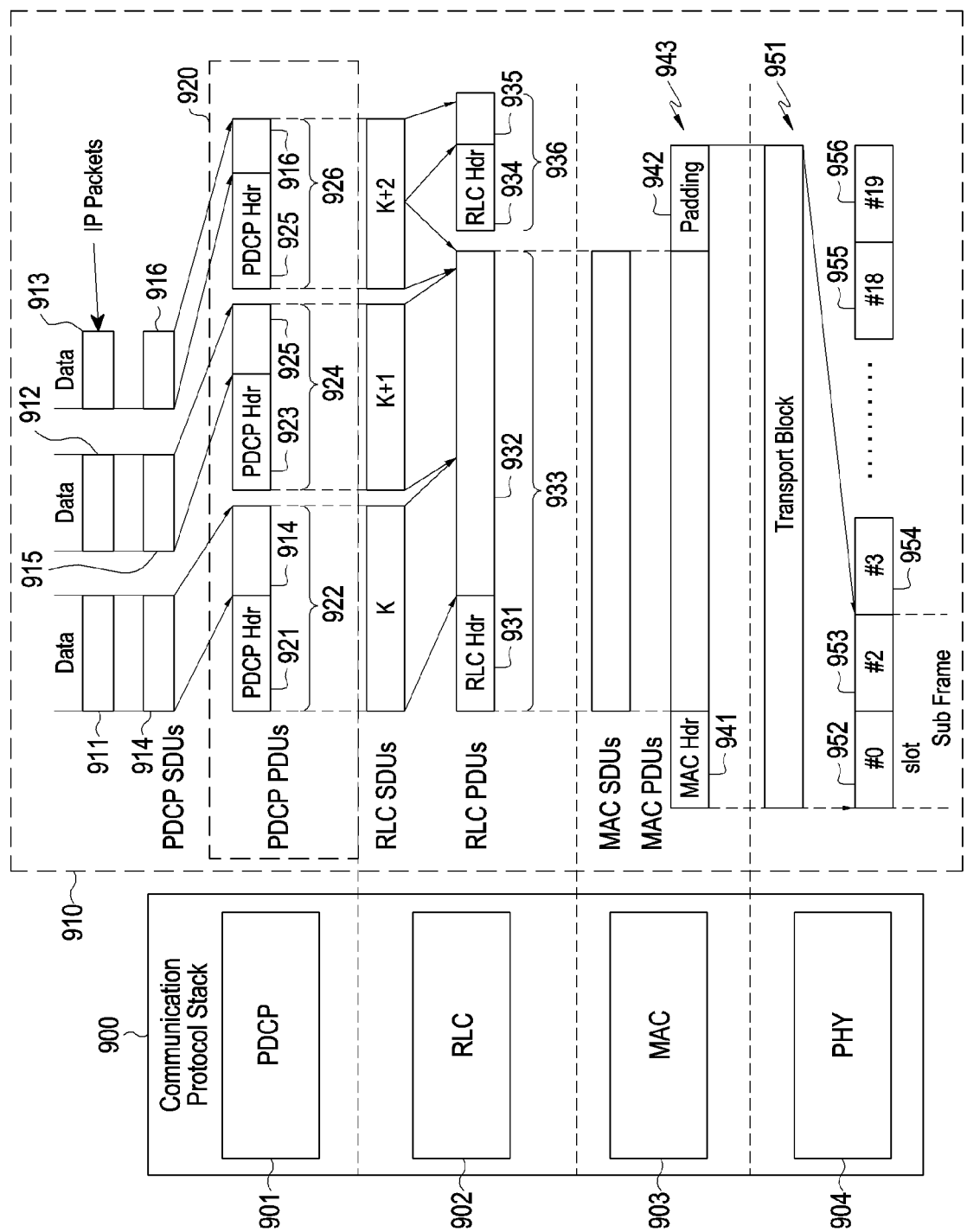
FIG. 9C illustrates a view of a data change between network layers.

Referring to FIG. 9C, according to an embodiment, a communication protocol stack 900 of an electronic device (e.g., the electronic device 101) may include a PDCP entity 901, an RLC entity 902, a MAC entity 903, and a PHY entity 904. The PDCP entity 901, the RLC entity 902, the MAC entity 903, and the PHY entity 904 may be entities based on the radio protocol of LTE system or entities based on the radio protocol of NR system. For example, if the electronic device transmits/receives data based on LTE, the PDCP entity 901, RLC entity 902, MAC entity 903, and PHY entity 904 based on the radio protocol of LTE system may be configured. For example, if the electronic device transmits/receives data based on NR, the PDCP entity 901, RLC entity 902, MAC entity 903, and PHY entity 904 based on the radio protocol of NR system may be configured. For example, packet data processed based on the PDCP entity 901, RLC entity 902, MAC entity 903, and PHY entity 904 may be stored at least temporarily in some logical area or some physical area of the memory 910 (e.g., the volatile memory 132 of FIG. 1 or a memory in the communication processor 212, 214, or 260) of the electronic device. According to an embodiment, the PDCP entity 901 may further include PDCP headers 921, 923, and 925 in PDCP SDUs 914, 915, and 916 which are based on data 911, 912, and 913 which are internet protocol (IP) packets and may transfer PDCP PDUs 922, 924, and 926. The information about the PDCP header transferred by the LTE PDCP entity may differ from the information about the PDCP header transferred by the NR PDCP entity. According to an embodiment, the PDCP buffer 920 may be implemented in a designated logical or physical area inside the memory 910. The PDCP buffer 920 may receive the PDCP SDUs 914, 915, and 916 based on the PDCP entity 901 and, at least temporarily, store them, and the PDCP buffer 920 may further include the PDCP headers 921, 923, and 925 in the PDCP SDUs 914, 915, and 916 and transfer the PDCP PDUs 922, 924, and 926 to the RLC layer.

According to an embodiment, the RLC entity 902 may add the RLC headers 931 and 934 to the first data 932 and second data 935, respectively, which have been obtained by reconstructing the RLC SDUs 922, 924, and 926 and may transfer the RLC PDUs 933 and 936. The LTE-based RLC header information may differ from the NR-based RLC header information.

According to an embodiment, the MAC entity 902 may add the MAC header 941 and padding 942 to, e.g., the MAC SDU 933 and transfer the MAC PDU 943 which, as the transport block 951, may be processed in the physical layer 904. The transport block 951 may be processed as slots 952, 953, 954, 955, and 956.

According to an embodiment, although not shown in FIG. 9C, the memory 910 may include a buffer corresponding to each of the RLC layer and the MAC layer.

Hereinafter, a method of controlling power in a communication processor of an electronic device is described with reference to FIGS. 10 to 13.

Figure 10:
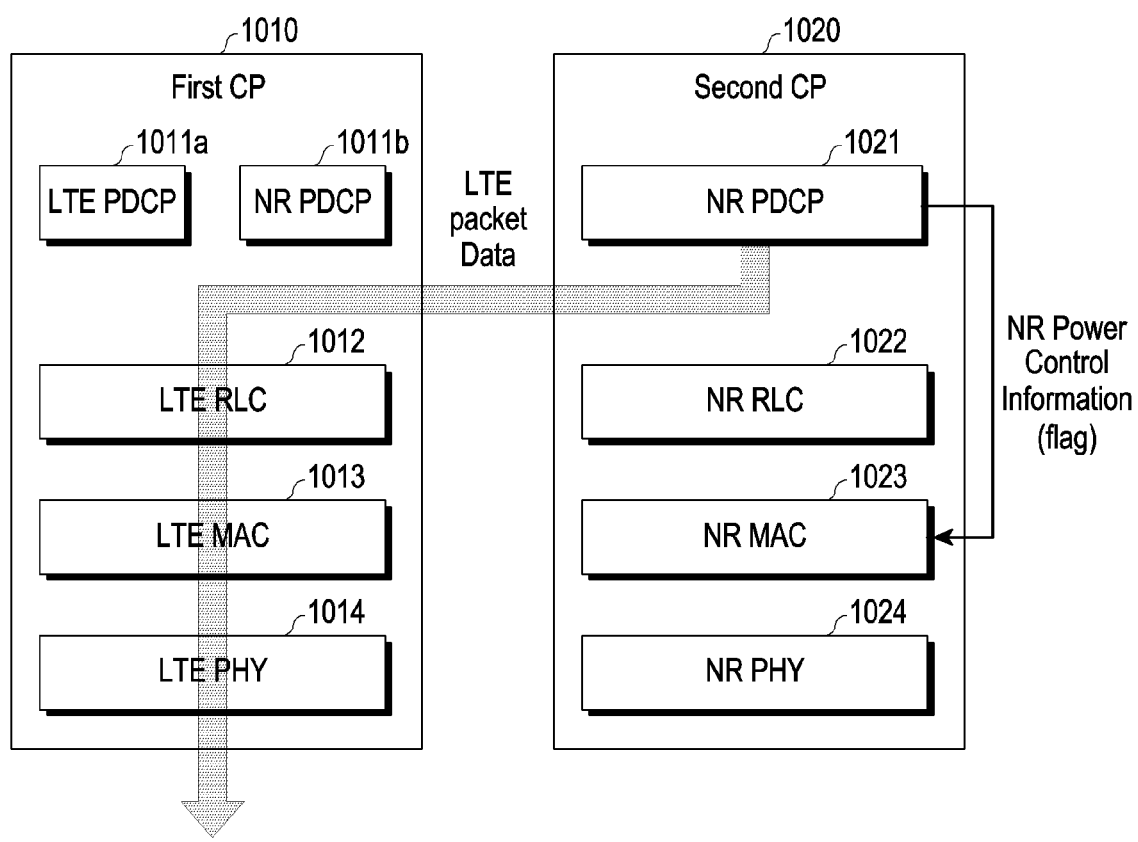
FIG. 10 illustrates a view of a power control method of an electronic device according to an embodiment.

FIG. 10 illustrates a view of a power control method of an electronic device according to an embodiment. FIG. 10 illustrates an example in which two communication processors (CPs) which are implemented as chips are provided for their respective corresponding communication networks. For example, in the example illustrated in FIG. 10, data to be transmitted by the split bearer is processed.

According to an embodiment, a first CP 1010, a communication processor for processing LTE communication signals, may include (or execute) an LTE PDCP 1011a, an NR PDCP 1011b, an LTE RLC 1012, an LTE MAC 1013, and an LTE PHY 1014. A second CP 1020, a communication processor for processing NR communication signals, may include (or execute) an NR PDCP 1021, an NR RLC 1022, an NR MAC 1023, and an NR PHY 1024.

According to an embodiment, the data to be transmitted by the split bearer may be transferred to the NR PDCP 1021 of the second CP 1020. For example, the transferred data may be stored, at least temporarily, in the PDCP area (e.g., the PDCP buffer 920 of FIG. 9C). The NR PDCP 1021 may receive the data to be transmitted via the split bearer, and the NR PDCP 1021 may transfer data to be transmitted via the LTE communication network to the LTE RLC 1012 of the first CP 1010 and the data to be transmitted via the NR communication network to the NR RLC 1022. The transmission path of the split bearer may be identified by the LCID of the PDCP packet. LCID may refer to the identifier of the RLC entity that has generated the RLC PDU (or MAC SDU) received from the higher layer.

According to an embodiment, the NR PDCP 1021 of the second CP 1020 may receive the packet data to be transmitted via the split bearer and, if sensing the LTE transmission data via the LCID, determine that there is LTE transmission data to be transmitted via the LTE communication network and, considering this, control the transmission power of NR transmission data. According to an embodiment, the NR PDCP 1021, upon sensing the LTE transmission data, may notify the NR MAC 1023 of information for power control. The power control information provided from the NR PDCP 1021 to the NR MAC 1023 may include a flag indicating the presence or absence of the LTE transmission data. For example, the flag may be set to DPS_value as static variable. According to an embodiment, the NR PDCP 1021, if the received packet data includes LTE transmission data, may set PDS_value to 1 and transfer the flag to the NR MAC 1023. The NR PDCP 1021, unless the received packet data includes LTE transmission data, may set PDS_value to 0 and transfer the flag to the NR MAC 1023.

According to an embodiment, the NR MAC 1023 may identify the flag and adjust the transmission power considering whether there is LTE transmission data at a corresponding time. For example, the transmission power of NR transmission data may be adjusted according to the timings described above in connection with FIGS. 7A and 7B.

Figure 11:
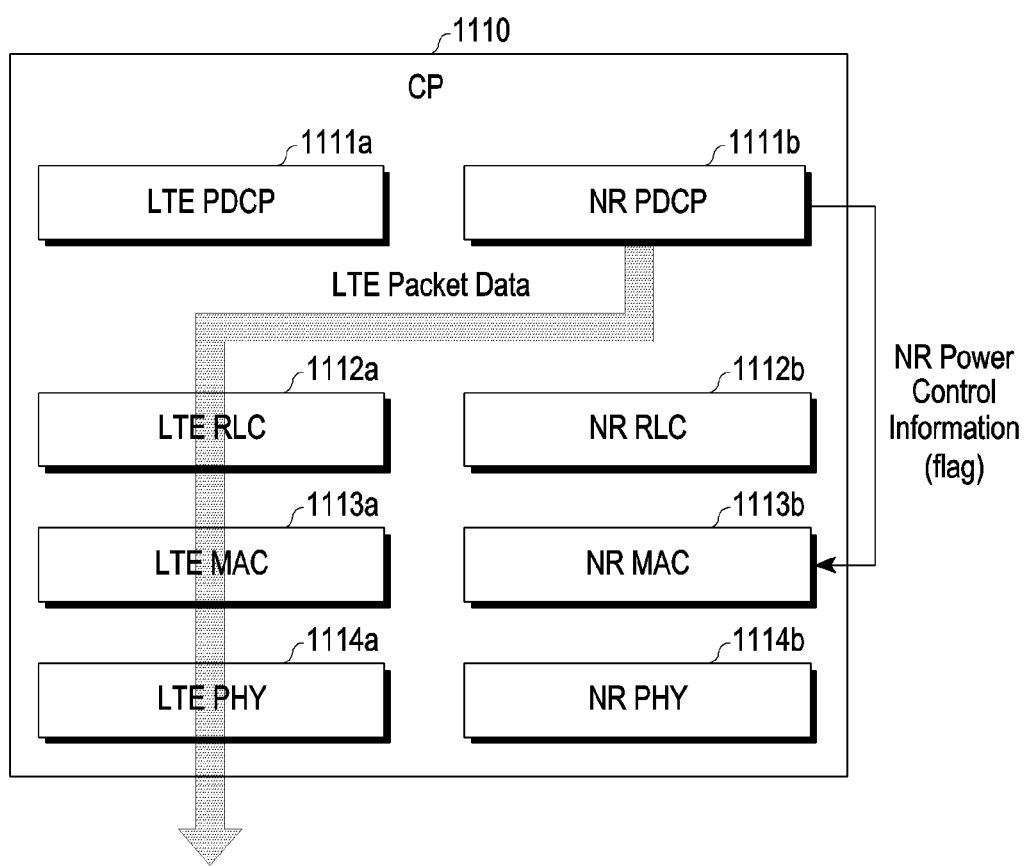
FIG. 11 illustrates a view of a power control method of an electronic device according to an embodiment.

FIG. 11 illustrates a view of a power control method of an electronic device according to an embodiment. FIG. 11 illustrates an example in which an integrated communication processor (CP) which is implemented as a single chip is provided. For example, in the example illustrated in FIG. 11, data to be transmitted by the split bearer is processed.

According to an embodiment, the CP 1110, as a communication processor for comprehensively processing LTE communication signals and NR communication signals and may include (or execute) an LTE PDCP 1111a, an LTE RLC 1112a, an LTE MAC 1113a, an LTE PHY 1114a, an NR PDCP 1111b, an NR RLC 1112b, an NR MAC 1113b, and an NR PHY 1114b.

According to an embodiment, the data to be transmitted by the split bearer may be transferred to the NR PDCP 1111b of the CP 1110. The NR PDCP 1111b may receive the data to be transmitted via the split bearer, and the NR PDCP 1111b may transfer data to be transmitted via the LTE communication network to the LTE RLC 1112a and the data to be transmitted via the NR communication network to the NR RLC 1112b. The transmission path of the split bearer may be identified by the LCD of the PDCP packet. LCD may refer to the identifier of the RLC entity that has generated the RLC PDU (or MAC SDU) received from the higher layer.

According to an embodiment, the NR PDCP 1111b may receive the packet data to be transmitted via the split bearer and, if sensing the LTE transmission data via the LCD, determine that there is LTE transmission data to be transmitted via the LTE communication network and, considering this, control the transmission power of NR transmission data. According to an embodiment, the NR PDCP 1111b, upon sensing the LTE transmission data, may notify the NR MAC 1113b of information for power control. The power control information provided from the NR PDCP 1111b to the NR MAC 1113b may include a flag indicating the presence or absence of the LTE transmission data. For example, the flag may be set to DPS_value as static variable. According to an embodiment, the NR PDCP 1021, if the received packet data includes LTE transmission data, may set PDS_value to 1 and transfer the flag to the NR MAC 1113*b*. The NR PDCP 1111*b*, unless the received packet data includes LTE transmission data, may set PDS_value to 0 and transfer the flag to the NR MAC 1113*b*.

According to an embodiment, the NR MAC 1113*b* may identify the flag and adjust the transmission power of NR transmission data considering whether there is LTE transmission data at a corresponding time, according to the above-described timings of FIGS. 7A and 7B.

An example in which LTE transmission data is transmitted by the LTE bearer is described with reference to FIGS. 12 and 13. For example, voice over LTE (VoLTE) may transmit voice or video packets using the LTE PDCP. The MO/Call connected state may be always sensed by the electronic device and, if a VoLTE call transmission packet is sensed by the LTE PDCP, the NR MAC may be notified of this.

Figure 12:
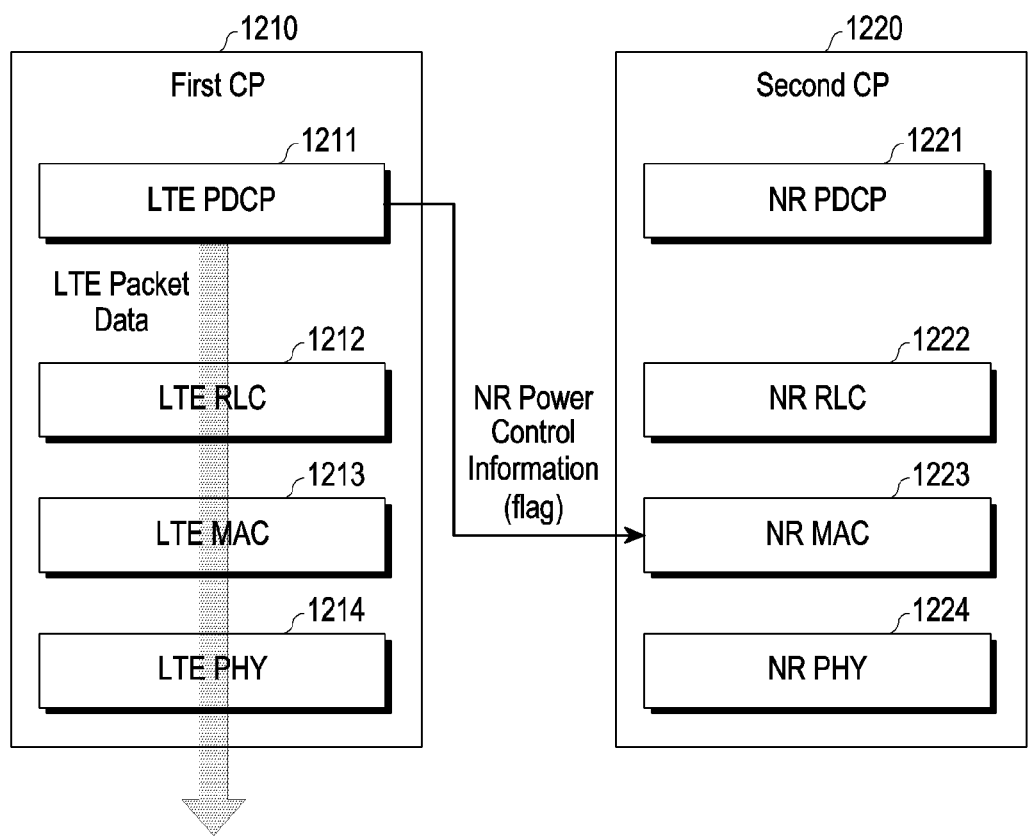
FIG. 12 illustrates a view of a power control method of an electronic device according to an embodiment.

FIG. 12 illustrates a view of a power control method of an electronic device according to an embodiment. FIG. 12 illustrates an example in which two communication processors (CPs) which are implemented as chips are provided for their respective corresponding communication networks. For example, in the example illustrated in FIG. 12, data to be transmitted by the LTE bearer is processed.

According to an embodiment, a first CP 1210, a communication processor for processing LTE communication signals, may include (or execute) an LTE PDCP 1211, an LTE RLC 1212, an LTE MAC 1213, and an LTE PHY 1214. A second CP 1220, a communication processor for processing NR communication signals, may include (or execute) an NR PDCP 1221, an NR RLC 1222, an NR MAC 1223, and an NR PHY 1224.

According to an embodiment, the data to be transmitted by the LTE bearer may be transferred to the LTE PDCP 1211 of the first CP 1210. The LTE PDCP 1211 may receive the data to be transmitted via the LTE bearer and transmit to the LTE RLC 1212.

According to an embodiment, the LTE PDCP 1211 of the first CP 1210, if sensing the packet data to be transmitted via the LTE bearer, may determine that there is LTE transmission data to be transmitted via the LTE communication network and, considering this, control the transmission power of NR transmission data. According to an embodiment, the LTE PDCP 1211, upon sensing the LTE transmission data, may notify the NR MAC 1223 of the second CP 1220 of information for power control. The power control information provided from the LTE PDCP 1211 to the NR MAC 1223 may include a flag indicating the presence or absence of the LTE transmission data. For example, the flag may be set to DPS_value as static variable. According to an embodiment, the LTE PDCP 1211, if the LTE PDCP buffer includes LTE transmission data, may set PDS_value to 1 and transfer the flag to the NR MAC 1223. The LTE PDCP 1211, unless the LTE PDCP buffer includes LTE transmission data, may set PDS_value to 0 and transfer the flag to the NR MAC 1223.

According to an embodiment, the NR MAC 1223 may identify the flag and adjust the transmission power of NR transmission data considering whether there is LTE transmission data at a corresponding time, according to the above-described timings of FIGS. 7A and 7B.

According to an embodiment, if two communication processor (CP) chips 1210 and 1220 are implemented per communication network as shown in FIG. 12, the flag indicating whether there is LTE transmission data may be transmitted from the first CP 1210 to the second CP 1220.

According to an embodiment, the flag may be transmitted by direct communication between the CPs 1210 and 1220. According to an embodiment, the flag may be transmitted from the first CP 1210 through a processor (e.g., an application processor (e.g., the processor 120 of FIGS. 1 and 2)) connected with the first CP 1210 to the second CP 1220. According to an embodiment, communication between the first CP 1210 and the second CP 1220 may be performed via a PCIE interface but is not limited thereto. According to an embodiment, the first CP 1210 or the second CP 1220 may communicate with the processor (e.g., the processor 120 of FIGS. 1 and 2) via a PCIE interface but is not limited thereto.

Figure 13:
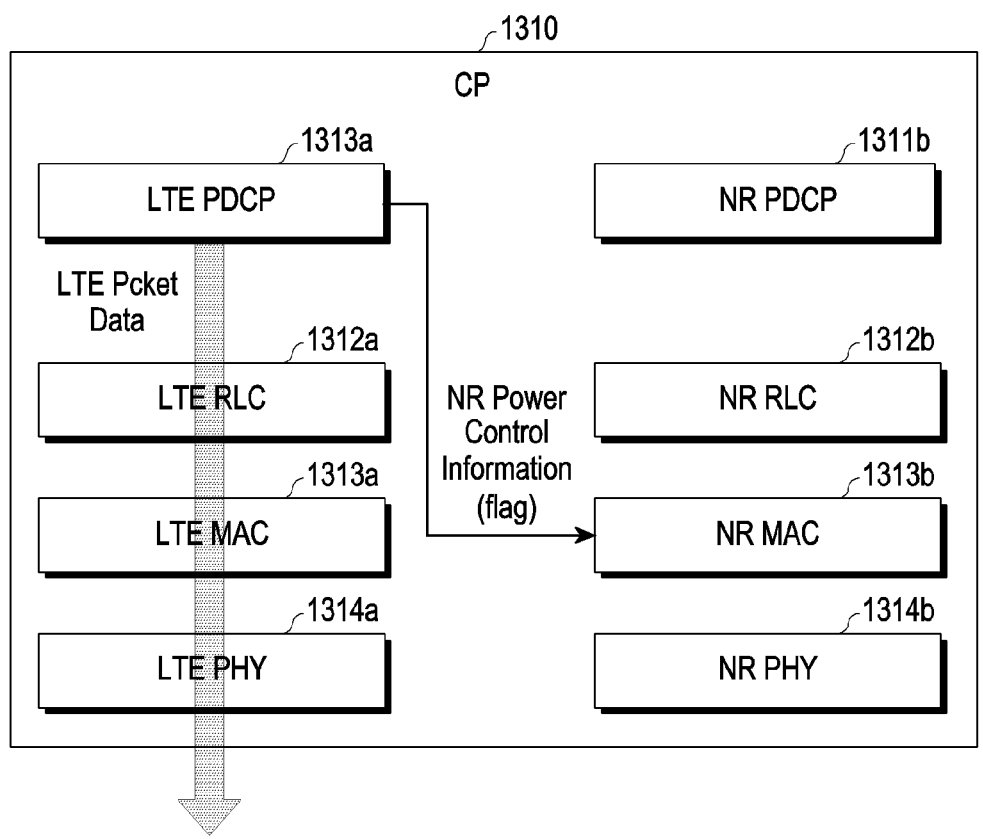
FIG. 13 illustrates a view of a power control method of an electronic device according to an embodiment.

FIG. 13 illustrates a view of a power control method of an electronic device according to an embodiment. FIG. 13 illustrates an example in which an integrated communication processor (CP) which is implemented as a single chip is provided. For example, in the example illustrated in FIG. 13, data to be transmitted by the LTE bearer is processed.

According to an embodiment, the CP 1310, as a communication processor for comprehensively processing LTE communication signals and NR communication signals, may include (or execute) an LTE PDCP 1311*a*, an LTE RLC 1312*a*, an LTE MAC 1313*a*, an LTE PHY 1314*a*, an NR PDCP 1311*b*, an NR RLC 1312*b*, an NR MAC 1313*b*, and an NR PHY 1314*b*.

According to an embodiment, the data to be transmitted by the LTE bearer may be transferred to the LTE PDCP 1313*a* of the CP 1310. The LTE PDCP 1313*a* may receive the data to be transmitted via the LTE bearer and transmit to the LTE RLC 1312*a*.

According to an embodiment, the LTE PDCP 1313*a* of the CP 1310, if sensing the packet data to be transmitted via the LTE bearer, may determine that there is LTE transmission data to be transmitted via the LTE communication network and, considering this, control the transmission power of NR transmission data. According to an embodiment, the LTE PDCP 1313*a*, upon sensing the LTE transmission data, may notify the NR MAC 1313*b* of information for power control. The power control information provided from the LTE PDCP 1313*a* to the NR MAC 1313*b* may include a flag indicating the presence or absence of the LTE transmission data. For example, the flag may be set to DPS_value as static variable. According to an embodiment, the LTE PDCP 1313*a*, if the LTE PDCP buffer includes LTE transmission data, may set PDS_value to 1 and transfer the flag to the NR MAC 1313*b*. The LTE PDCP 1313*a*, unless the LTE PDCP buffer includes LTE transmission data, may set PDS_value to 0 and transfer the flag to the NR MAC 1313*b*.

According to an embodiment, the NR MAC 1313*b* may identify the flag and adjust the transmission power of NR transmission data considering whether there is LTE transmission data at a corresponding time, according to the above-described timings of FIGS. 7A and 7B.

Figure 14:
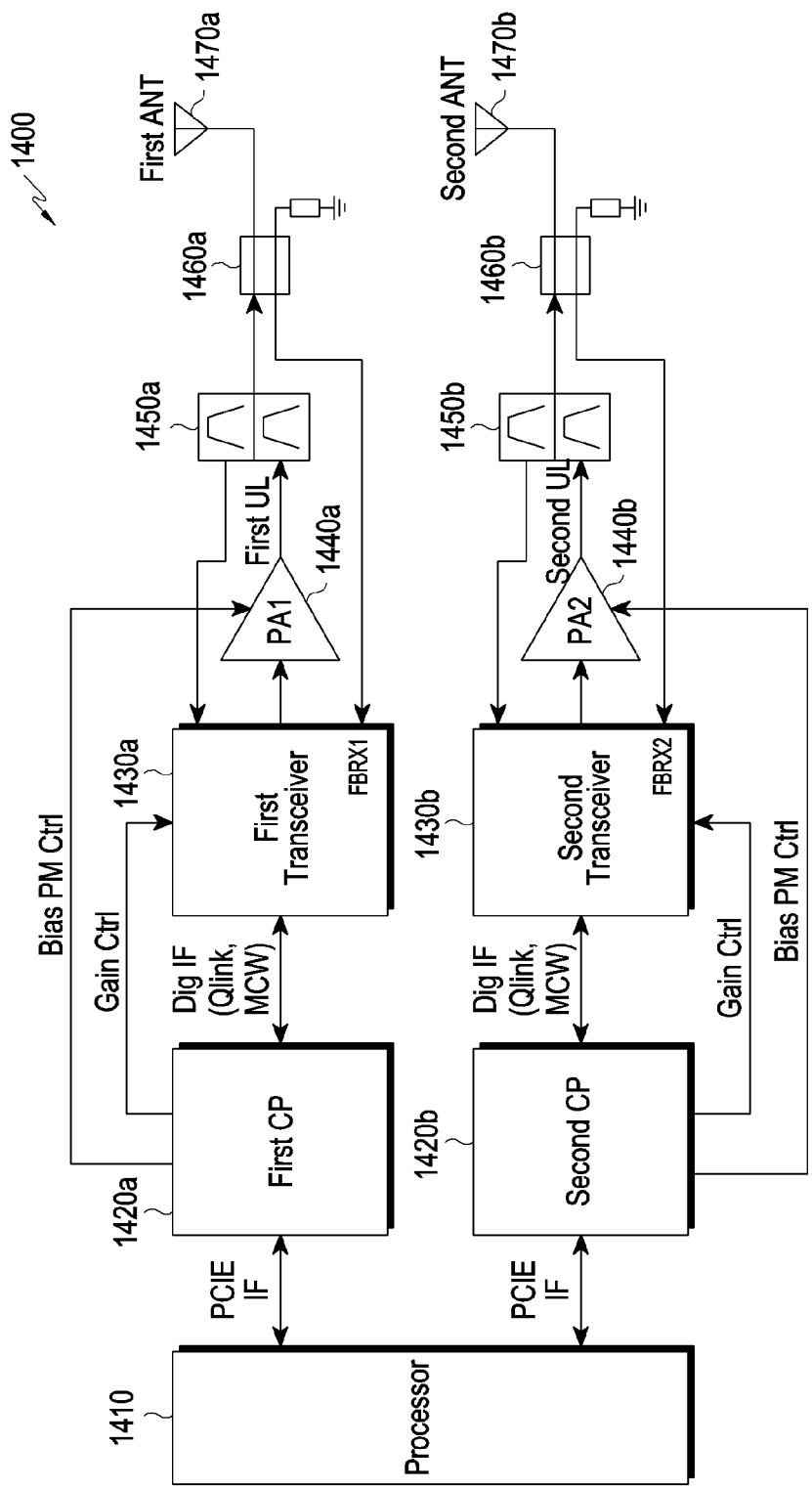
FIG. 14 illustrates a block diagram of an electronic device providing dual connectivity according to an embodiment.

FIG. 14 illustrates a block diagram of an electronic device providing dual connectivity according to an embodiment. Referring to FIG. 14, according to an embodiment, an electronic device 1400 may include a processor 1410 (e.g., the processor 120 of FIG. 1), a first communication processor 1420*a* (e.g., the first communication processor 212 of FIG. 2), a second communication processor 1420*b* (e.g., the second communication processor 214 of FIG. 2), a first transceiver 1430*a* (e.g., the first RFIC 222 or first RFEE 232 of FIG. 2), a second transceiver 1430*b* (e.g., the second RFIC 224 or second RFEE 234 of FIG. 2), a first power amplifier 1440*a*, a second power amplifier 1440*b*, a first duplexer 1450*a*, a second duplexer 1450*b*, a first coupler 1460*a*, a second coupler 1460*b*, a first antenna 1470*a* (e.g., the first antenna module 242 of FIG. 2 or the first RFEE 232), and a second antenna 1470b (e.g., the second antenna module 244 of FIG. 2). The electronic device 1400 of FIG. 14 may be identical or similar to the electronic device 101 of FIG. 1, 2A, or 2B.

According to an embodiment, the processor 1410 may include a controller (or control circuitry) and a shared memory (a memory shared by the first communication processor 1420a and the second communication processor 1420b).

According to an embodiment, the first communication processor 1420a may establish a communication channel of a band that is to be used for wireless communication with the first communication network or may support network communication via the established communication channel. According to an embodiment, the first communication network may be a legacy network that includes second generation (2G), third generation (3G), fourth generation (4G), or long-term evolution (LTE) networks. The second communication processor 1420b may establish a communication channel corresponding to a designated band (e.g., from about 450 MHz to about 6 GHz or from about 6 GHz to about 60 GHz) among bands that are to be used for wireless communication with the second communication network and may support fifth generation (5G) network communication via the established communication channel. According to an embodiment, the second communication network may be a 5G network defined by the 3rd generation partnership project (3GPP). Additionally, according to an embodiment, the first communication processor 1420a or the second communication processor 1420b may establish a communication channel corresponding to another designated band (e.g., about 6 GHz or less) among the bands that are to be used for wireless communication with the second communication network or may support fifth generation (5G) network communication via the established communication channel.

According to an embodiment, the first communication processor 1420a may perform data transmission/reception with the second communication processor 1420b. For example, the first communication processor 1420a may transmit/receive data to/from the second communication processor 1420b via a PCIE interface. The first communication processor 1420a may transmit/receive various pieces of information, such as sensing information, output strength information, or resource block (RB) allocation information, to/from the second communication processor 1420b.

According to implementation, the first communication processor 1420a may not be directly connected with the second communication processor 1420b. In this case, the first communication processor 1420a may transmit/receive data to/from the second communication processor 1420b via a processor 1410 (e.g., an application processor).

According to an embodiment, the first communication processor 1420a and the second communication processor 1420b may be implemented in a single chip or a single package. According to an embodiment, the first communication processor 1420a or the second communication processor 1420b, along with the processor 120, an assistance processor 123, or communication module 190, may be formed in a single chip or single package. For example, as shown in FIG. 2B, an integrated communication processor 260 may support all of the functions for communication with the first communication network and the second communication network.

According to an embodiment, the first transceiver 1430a and the second transceiver 1430b may receive frequency signals from a temperature-compensated crystal oscillator (TCXO) and output a first signal TX1 and a second signal TX2, respectively. The first transceiver 1430a may synthesize the PLL_1 signal with the signal provided from the first communication processor 1420a by a mixer and output a radio frequency (RF) signal that fits the frequency of the first communication network. The second transceiver 1430b may synthesize the PLL_2 signal with the signal provided from the second communication processor 1420b by a mixer and output a radio frequency (RF) signal that fits the frequency of the second communication network.

According to an embodiment, the first power amplifier 1440a positioned at a terminal of the first transceiver 1430a may amplify the RF signal and may include an amplifier that may minimize the distortion of output signal and maintain high-efficiency properties. The second power amplifier 1440b positioned at a terminal of the second transceiver 1430b may amplify the RF signal and may include an amplifier that may minimize the distortion of output signal and maintain high-efficiency properties.

According to an embodiment, the first duplexer may receive a first signal from the first power amplifier 1440a, provide it to the first antenna 1470a, receive a downlink signal received via the first antenna 1470a, and provide it to the first transceiver 1430a. The second duplexer may receive a second signal from the second power amplifier 1440b, provide it to the second antenna 1470b, receive a downlink signal received via the second antenna 1470b, and provide it to the second transceiver 1430b.

According to an embodiment, the first power amplifier 1440a may amplify the first signal TX1 received from the first transceiver 1430a by a designated gain under the control of the first communication processor 1420a and may provide it to the first antenna 1470a via the first coupler 1460a. The second power amplifier 1440b may amplify the second signal TX2 received from the second transceiver 1430b by a designated gain under the control of the second communication processor 1420b and may provide it to the second antenna 1470b via the second coupler 1460b.

According to an embodiment, the first signal transmitted via the first coupler 1460a may be fed back to the first transceiver 1430a, and the second signal transmitted via the second coupler 1460b may be fed back to the second transceiver 1430b.

According to an embodiment, the first transceiver 1430a and the second transceiver 1430b may use the transmission feedback signals fed back from the first coupler 1460a and the second coupler 1460b, respectively, to change the frequency using the internal local oscillator (LO) of the first communication processor 1420a or the second communication processor 1420b, thereby allowing them to be processed as baseband signals. According to an embodiment, the first transceiver 1430a and the second transceiver 1430b each may convert the transmission power signals into digital signals and transfer them to the first communication processor 1420a or the second communication processor 1420b. The couplers 1460a and 1460b may attenuate the signals amplified by their respective connected power amplifiers 1440a and 1440b into small signals that may be processed by the first transceiver 1430a and the second transceiver 1430b and feed them back.

According to an embodiment, the first communication processor 1420a may control the gain of the first signal transmitted via the first transceiver 1430a by a control signal and may control the bias of the first power amplifier 1440a. The second communication processor 1420b may control the gain of the second signal transmitted via the second transceiver 1430*b* by a control signal and may control the bias of the second power amplifier 1440*b*.

According to an embodiment, in the electronic device providing dual connectivity as shown in FIG. 14, the transceivers 1430*a* and 1430*b* may convert sensing signals input via the FBRX port into baseband signals and transmit the digital sensing signals to their respective connected communication processors 1420*a* and 1420*b* via the analog/digital converter (ADC). The communication processors 1420*a* and 1420*b* may monitor, e.g., resource block (RB) allocation information and the magnitude of power of signals currently output from the power amplifiers 1440*a* and 1440*b* using the sensing information transferred via the transceivers 1430*a* and 1430*b*, respectively, and they may adjust each transmission signal to fit for the communication context.

According to an embodiment, information exchange between the communication processors 1420*a* and 1420*b* may be performed via the processor 1410 and communication information (e.g., activated band or channel) which varies relatively less may be shared therebetween.

According to an embodiment, the first communication processor 1420*a* may identify transmission of transmission data (e.g., NR transmission data) to be transmitted via the first communication network by the first transceiver 1430*a* and, upon transmission of transmission data of the first communication network, identify the presence or absence of transmission data (e.g., LTE transmission data) to be transmitted via the second communication network by the second transceiver 1430*b* from the PDCP buffer included in the first communication processor 1420*a* or the second communication processor 1420*b*.

According to an embodiment, if it is identified that there is no transmission data to be transmitted via the second communication network, the first communication processor 1420*a* may control the transmission power of transmission data to be transmitted via the first communication network based on second maximum transmission power Pmax2 which is larger than preset first maximum transmission power Pmax1. For example, the first communication processor 1420*a* may control the gain of transmission data transmitted via the first transceiver 1430*a* based on the second maximum transmission power Pmax2 which is larger than the preset first maximum transmission power Pmax1 and may control the bias of the first power amplifier 1440*a*.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments, the optimal real-time uplink power distribution may be achieved even in the dual connectivity structure that has difficulty in adopting dynamic power sharing.

According to various embodiments, the dual connectivity-supporting electronic device may maximally use NR transmission power by determining whether there is LTE transmission data via a packet data convergence protocol (PDCP) buffer even when dynamic power sharing is difficult to apply.

For example, there is provided an interval where the NR uplink transmission power up to 23 dBm is available in the dual connectivity-supporting electronic device. Thus, various issues with shortage of transmission power may be addressed.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
    a first transceiver configured to transmit/receive data via a first communication network;
    a second transceiver configured to transmit/receive data via a second communication network; and
    at least one communication processor electrically connected with at least one of the first transceiver and the second transceiver, wherein the at least one communication processor is configured to:
        identify transmission of transmission data via the first communication network, upon transmission of the transmission data via the first communication network,
        identify whether there is transmission data to be transmitted via the second communication network from a packet data convergence protocol (PDCP) buffer, and
        when it is identified that there is no transmission data to be transmitted via the second communication network, perform control to transmit the transmission data to be transmitted via the first communication network, via the first transceiver, based on a second maximum transmission power larger than a preset first maximum transmission power,
    wherein the at least one communication processor is configured to apply the second maximum transmission power considering a time when data is processed by a PDCP layer corresponding to the second communication network to a physical layer.

2. The electronic device of claim 1, wherein the at least one communication processor is configured to, when it is identified that there is transmission data to be transmitted via the second communication network, perform control to transmit the transmission data to be transmitted via the first communication network, via the first transceiver based on, at least, the preset first maximum transmission power.

3. The electronic device of claim 1, wherein the at least one communication processor is configured to identify whether there is transmission data to be transmitted via a long term evolution (LTE) communication network from an LTE PDCP buffer and transmit a result of the identification to a new radio (NR) media access control (MAC) entity.

4. The electronic device of claim 3, wherein the at least one communication processor is configured to, when it is identified that there is no transmission data to be transmitted via the LTE communication network, transmit a flag indicating that there is no transmission data to the NR MAC entity.

5. The electronic device of claim 4, wherein the at least one communication processor is configured to, when the NR MAC entity receives the flag indicating that there is no transmission data to be transmitted via the LTE communication network, perform control to transmit the transmission data to be transmitted via the first communication network, via the first transceiver.

6. The electronic device of claim 5, wherein the at least one communication processor is configured to apply the second maximum transmission power considering a time when data is processed from an LTE PDCP layer to a physical layer.

7. The electronic device of claim 6, wherein the at least one communication processor is configured to apply the second maximum transmission power further considering a retransmission processing time of the transmission data to be transmitted via the LTE communication network.

8. The electronic device of claim 3, wherein the at least one communication processor is configured to, when it is identified that there is the transmission data to be transmitted via the LTE communication network, transmit a flag indicating that there is the transmission data to the NR MAC entity.

9. The electronic device of claim 8, wherein the at least one communication processor is configured to, when the NR MAC entity receives the flag indicating that there is the transmission data to be transmitted via the LTE communication network, perform control to transmit the transmission data to be transmitted via the first communication network, via the first transceiver based on the first maximum transmission power.

10. The electronic device of claim 9, wherein the at least one communication processor is configured to apply the first maximum transmission power considering a time when data is processed from an LTE PDCP layer to a physical layer.

11. The electronic device of claim 1, wherein the at least one communication processor is configured to identify a transmission time of transmission data to be transmitted via the first communication network based on scheduling information for transmission data received from a base station and identify whether there is transmission data to be transmitted via the second communication network at the identified transmission time.

12. A method of controlling transmission power by an electronic device, the method comprising:
    identifying transmission of transmission data via a first communication network;

upon transmission of the transmission data via the first communication network, identifying whether there is transmission data to be transmitted via a second communication network from a packet data convergence protocol (PDCP) buffer; and when it is identified that there is no transmission data to be transmitted via the second communication network, transmit the transmission data to be transmitted via the first communication network, based on a second maximum transmission power larger than a preset first maximum transmission power, wherein the second maximum transmission power is applied for transmission of the transmission data considering a time when data is processed by a PDCP layer corresponding to the second communication network to a physical layer.

13. The method of claim 12, further comprising:

identifying whether there is transmission data to be transmitted via a long term evolution (LTE) communication network from an LTE PDCP buffer; and transmitting a result of the identification to a new radio (NR) media access control (MAC) entity.

14. The method of claim 13, further comprising, when it is identified that there is no transmission data to be transmitted via the LTE communication network, transmitting a flag indicating that there is no transmission data to the NR MAC entity.

15. The method of claim 14, further comprising, when the NR MAC entity receives the flag indicating that there is no transmission data to be transmitted via the LTE communication network, transmitting the transmission data to be transmitted via the first communication network, via a first transceiver based on the second maximum transmission power.

16. The method of claim 15, further comprising applying the second maximum transmission power considering a time when data is processed from an LTE PDCP layer to a physical layer.

17. The method of claim 16, further comprising applying the second maximum transmission power further considering a retransmission processing time of the transmission data to be transmitted via the LTE communication network.

18. The method of claim 13, further comprising, when it is identified that there is the transmission data to be transmitted via the LTE communication network, transmitting a flag indicating that there is the transmission data to the NR MAC entity.

19. The method of claim 18, further comprising, when the NR MAC entity receives the flag indicating that there is the transmission data to be transmitted via the LTE communication network, transmitting the transmission data to be transmitted via the first communication network, via a first transceiver based on the first maximum transmission power.

20. The method of claim 19, further comprising applying the first maximum transmission power considering a time when data is processed from an LTE PDCP layer to a physical layer.

* * * * *